United States Patent
Lambert et al.

(10) Patent No.: US 12,466,658 B2
(45) Date of Patent: Nov. 11, 2025

(54) CONVEYOR SYSTEM USING MOVING ELEMENTS TO ADJUST PART PITCH

(71) Applicant: ATS Corporation, Cambridge (CA)

(72) Inventors: Blake Robert Lambert, Cambridge (CA); Roger Hogan, Cambridge (CA); Albert John Kleinikkink, Cambridge (CA)

(73) Assignee: ATS Corporation, Cambridge (CA)

( * ) Notice: Subject to any disclaimer, the term of this patent is extended or adjusted under 35 U.S.C. 154(b) by 26 days.

(21) Appl. No.: 18/186,272

(22) Filed: Mar. 20, 2023

(65) Prior Publication Data
US 2023/0294926 A1  Sep. 21, 2023

Related U.S. Application Data

(60) Provisional application No. 63/321,123, filed on Mar. 18, 2022.

(30) Foreign Application Priority Data

Mar. 17, 2023 (EP) .................................. 23162614

(51) Int. Cl.
*B65G 21/22* (2006.01)
*B65G 23/23* (2006.01)

(52) U.S. Cl.
CPC ............ *B65G 21/22* (2013.01); *B65G 23/23* (2013.01)

(58) Field of Classification Search
CPC ......... B65G 21/22; B65G 23/23; B65G 54/02
See application file for complete search history.

(56) References Cited

U.S. PATENT DOCUMENTS 6,119,846 A * 9/2000 Dufour .................. B65H 29/04
    198/460.3
8,397,896 B2 * 3/2013 Kleinikkink ......... B23Q 7/1447
    198/747

(Continued)

FOREIGN PATENT DOCUMENTS

EP          2743192 A1 * 6/2014 ............. B65G 54/02
WO   WO-2022015444 A1 * 1/2022 ........... B65G 1/0492

OTHER PUBLICATIONS

IPSearch History Jul. 10, 2025 UTC; InnovationQ+; https://iq.ip.com/discover (Year: 2025).*

(Continued)

*Primary Examiner* — Gene O Crawford
*Assistant Examiner* — Abby A Jorgensen
(74) *Attorney, Agent, or Firm* — Amarok IP Inc.; Neil W. Henderson

(57) ABSTRACT

A conveyor system configured to allow adjustment of part pitch by moving elements. The conveyor system including: a track; at least two moving elements configured to move on the track; and a pitch assembly mounted on the at least two moving elements, the pitch assembly including: at least one rail provided on at least one of the moving elements; a plurality of nests; and a mechanical linkage connected to the at least two moving elements; wherein the nests are slidably engaged with the rail to maintain linear motion and connected with the mechanical linkage such that, as the moving elements move closer together, the mechanical linkage contracts and slides the plurality of nests closer together for a reduced pitch, and, as the moving elements move apart from each other, the mechanical linkage extends and slides the plurality of nests apart for an increased pitch.

16 Claims, 24 Drawing Sheets

(56) References Cited

U.S. PATENT DOCUMENTS

| | | | | |
|---|---|---|---|---|
| 9,403,611 B2* | 8/2016 | Sacchetti | ............ | B65G 47/842 |
| 11,807,462 B2* | 11/2023 | Bonnain | ............. | B65G 37/005 |
| 2010/0147652 A1* | 6/2010 | Dirmeier | ............ | B65G 47/5131 |
| | | | | 198/457.01 |
| 2012/0247925 A1* | 10/2012 | Cooke | ................... | B65G 23/23 |
| | | | | 198/619 |
| 2019/0375597 A1* | 12/2019 | Kleinikkink | ........... | H02K 41/02 |

OTHER PUBLICATIONS

Extended European Search Report, European Patent Office, on corresponding EP Application No. 23162614.4 dated Aug. 10, 2023.

* cited by examiner

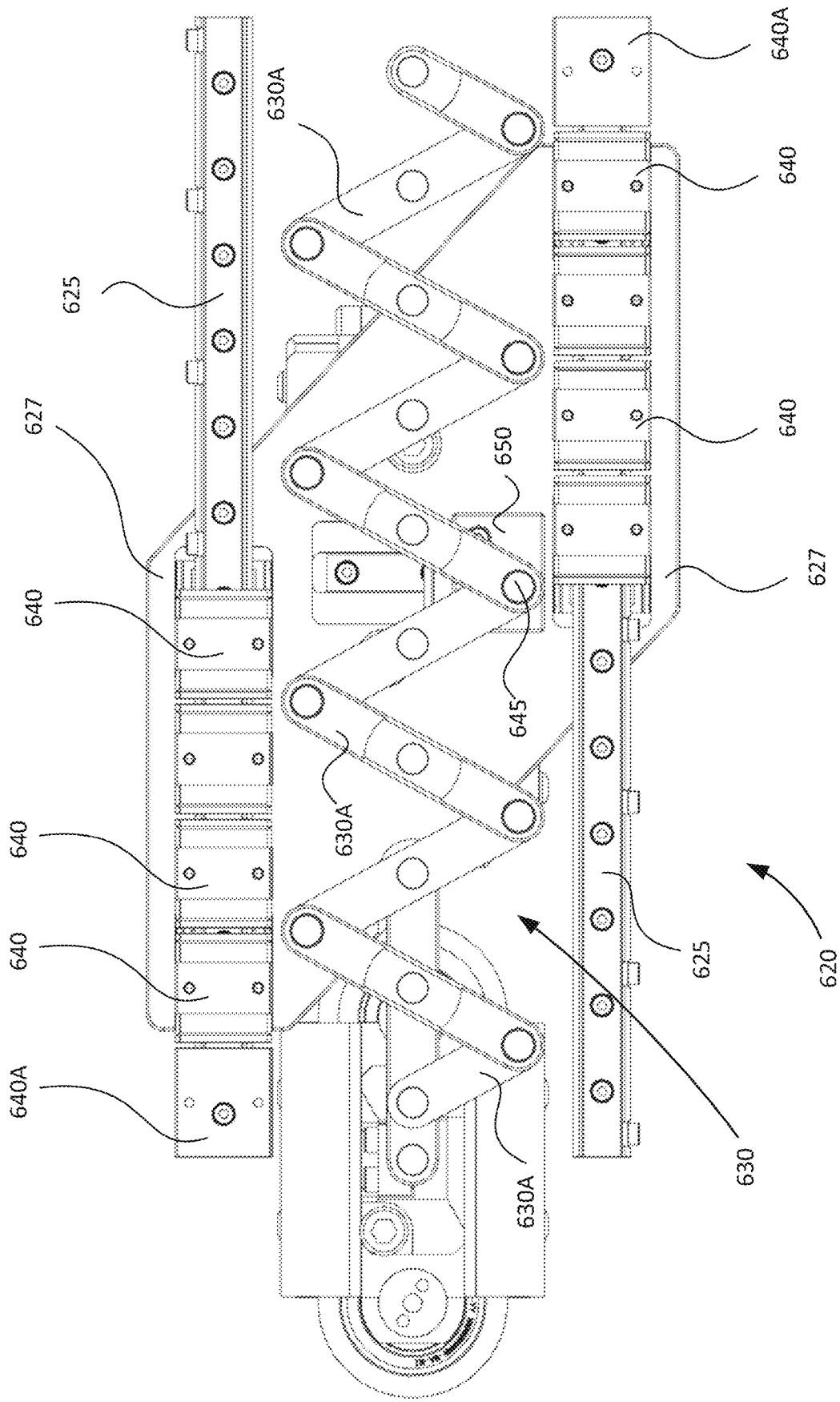

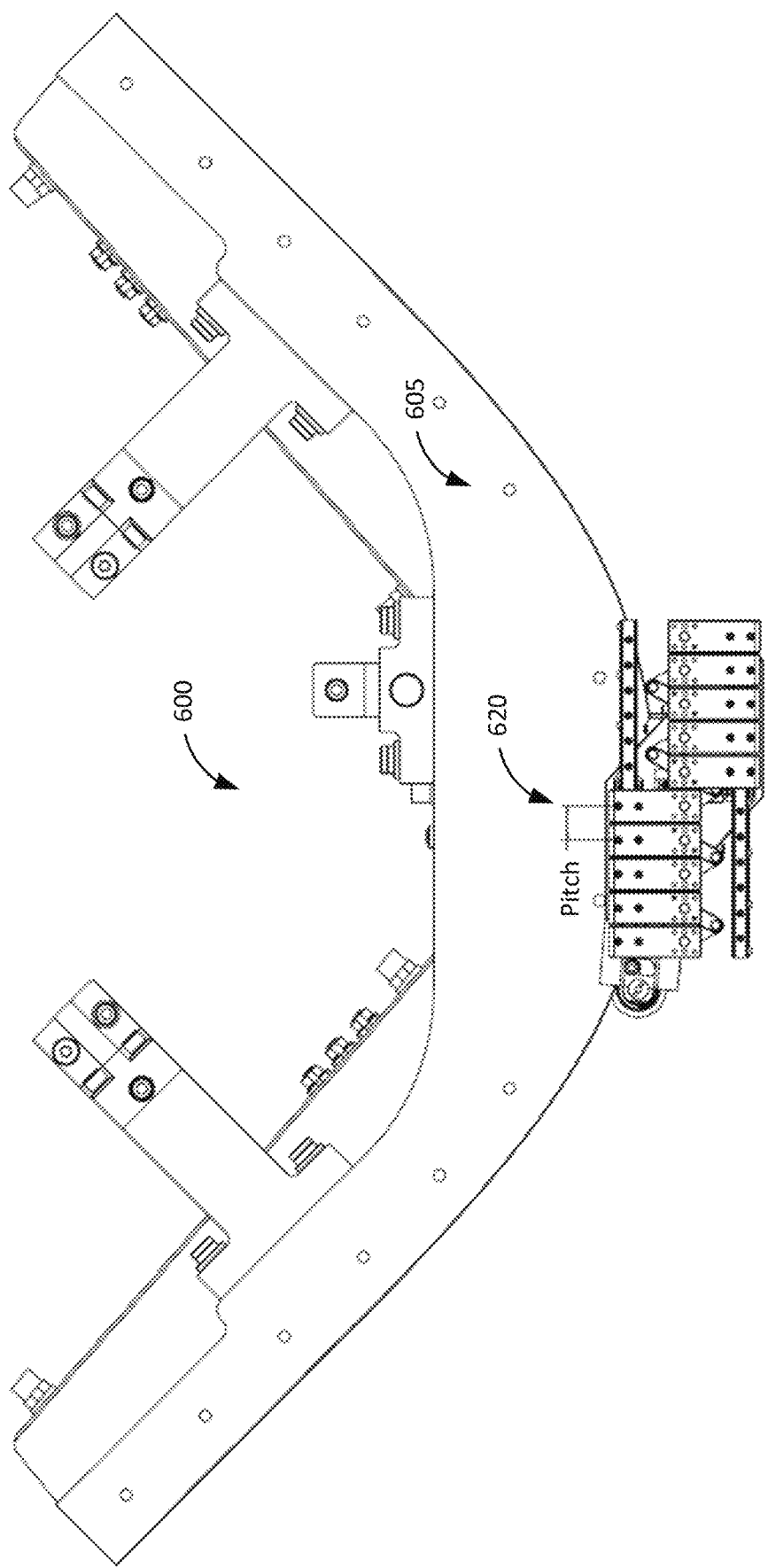

CONVEYOR SYSTEM USING MOVING ELEMENTS TO ADJUST PART PITCH

FIELD

The present disclosure relates generally to conveyor systems for supporting moving elements and, more particularly to a conveyor system using the moving elements to adjust part pitch.

BACKGROUND

In manufacturing environments, a conveyor system is often used to move parts among stations at which operations are performed on the parts as a part of the manufacturing process. One of the parameters that can be important in the manufacturing process can be the pitch of the parts (i.e. distance between adjacent parts) as they move along the conveyor system. For example, one station may operate best when the parts are a at a smaller pitch while another station may operate most efficiently when the parts are at a larger pitch. Similarly, the footprint (space required) of the conveyor system can be reduced if the parts have a smaller pitch. In some conveyor systems, the parts are carried by pallets, nests or the like that may include tooling or the like to hold the parts in position on the pallet/nest. In this case, it will be understood that the pitch of the parts will generally be related to the pitch of the pallets. In some conventional conveyor systems, the pallets are configured to provide a reduced pitch.

One type of conveyor system is a linear motor conveyor system. In a linear motor conveyor system, a moving element is controlled to move along a track by electromotive force. In this type of system, each moving element can generally be controlled independently. In order to allow for smooth movement, the moving element generally has bearings which run along the track and the moving element is supported by guides or guide rails or the like on the track. The guide rails may, for example, engage with the bearings or with the moving element itself. The bearings may include plain bearings, ball bearings, needle bearings, roller bearings, wheel bearings and the like.

In linear motor systems, forces, including acceleration, on the moving element can be high in order to move or stop the moving element quickly in order to increase production speeds. In this environment, the moving elements tend to be larger in a direction of travel along the track to provide extra stability against the applied forces. In these conveyor systems, the moving elements carry the pallets/nests that hold the parts and, because of the larger moving element size, there can be a larger pitch between pallets/parts on adjacent moving elements. Since the moving elements have a limit to their width based on the acceleration and the like, it can be difficult to further reduce the part pitch for some uses of the conveyor system.

Therefore, there is a need for a conveyor system that is capable of providing a more compact part pitch while also providing stability and ease of handling of the moving elements.

SUMMARY

According to an aspect herein there is provided a conveyor system including: a track; at least two moving elements configured to move on the track; and a pitch assembly mounted on the at least two moving elements, the pitch assembly including: at least one rail provided on at least one of the moving elements; a plurality of nests; and a mechanical linkage connected to the at least two moving elements; wherein the nests are slidably engaged with the rail to maintain linear motion and connected with the mechanical linkage such that, as the moving elements move closer together, the mechanical linkage contracts and slides the plurality of nests closer together for a reduced pitch, and, as the moving elements move apart from each other, the mechanical linkage extends and slides the plurality of nests apart for an increased pitch.

In this arrangement, the mechanical linkage provides the ability to adjust the pitch between nests (and thus parts on the nests) and the rail provides stability to the nests and keeps the nests moving in a linear manner.

In some cases, the at least one rail may include two rails, which may be slidably mounted on at least one of the at least two moving elements.

In some cases, the mechanical linkage may include a plurality of links arranged in a single-sided scissors mechanism. Although a two-sided scissors mechanism could be used, the provision of a rail provides stability that can allow for the lighter single-sided scissors mechanism to be used.

In some cases, the mechanical linkage may include a pivot link between one of the at least two moving elements and the remainder of the mechanical linkage to allow the mechanical linkage to pivot in relation to the one of the moving elements. This arrangement including the pivot link provides for flexibility as the moving elements move around corners, adapt to differences in the surface of the track, or the like.

In some cases, the pitch assembly may further include a slidable support connecting the mechanical linkage to one of the at least two moving elements to compensate for contraction and elongation.

In some cases, a pitch between nests may be configured to have a ratio between minimum and maximum pitch of 1:2.

In some cases, the track is a linear motor and each of the at least two moving elements may include at least one magnetic element such that each moving element can be independently moved along the track by electromotive force.

According to an aspect herein there is provided a pitch assembly for a conveyor system. The pitch assembly including: at least one rail provided on at least one of the moving elements; a plurality of nests; and a mechanical linkage connected to the at least two moving elements; wherein the nests are slidably engaged with the rail to maintain linear motion and connected with the mechanical linkage such that, as the moving elements move closer together, the mechanical linkage contracts and slides the plurality of nests closer together for a reduced pitch, and, as the moving elements move apart from each other, the mechanical linkage extends and slides the plurality of nests apart for an increased pitch.

In some cases, the at least one rail may include two rails, which may be slidably mounted on at least one of the at least two moving elements.

In some cases, the mechanical linkage may include a plurality of links arranged in a single-sided scissors mechanism.

In some cases, the mechanical linkage may include a pivot link between one of the moving elements and the remainder of the mechanical linkage to allow the mechanical linkage to pivot in relation to the one of the moving elements.

In some cases, the pitch assembly may further include a slidable support connecting the mechanical linkage to one of the at least two moving elements to compensate for contraction and elongation.

In some cases, a pitch between nests may be configured to have a ratio between minimum and maximum pitch of 1:2.

According to an aspect herein there is provided a method of adjusting part pitch on a conveyor system, the method including: forming a pitch assembly by supporting part nests with a mechanical linkage and at least one linear rail; mounting the pitch assembly on at least two moving elements of the conveyor system, the pitch assembly including a plurality of nests for supporting parts; moving the at least two moving elements apart to increase the pitch of the plurality of nests; moving the at least two moving elements together to decrease the pitch of the plurality of nests; and maintaining a spacing between the at least two moving elements to maintain the pitch of the plurality of nests.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 8C is a top view of the pitch assembly of FIGS. 8A and 8B with nests removed;

FIG. 12A illustrates a top view of the conveyor system of FIG. 11;

DETAILED DESCRIPTION

Generally, the present disclosure provides a conveyor system using moving elements to adjust part pitch. In particular, the conveyor system can be a linear motor conveyor system where a combination of two or more moving elements support a plurality of nests via a pitch adjustment assembly.

Figure 1:
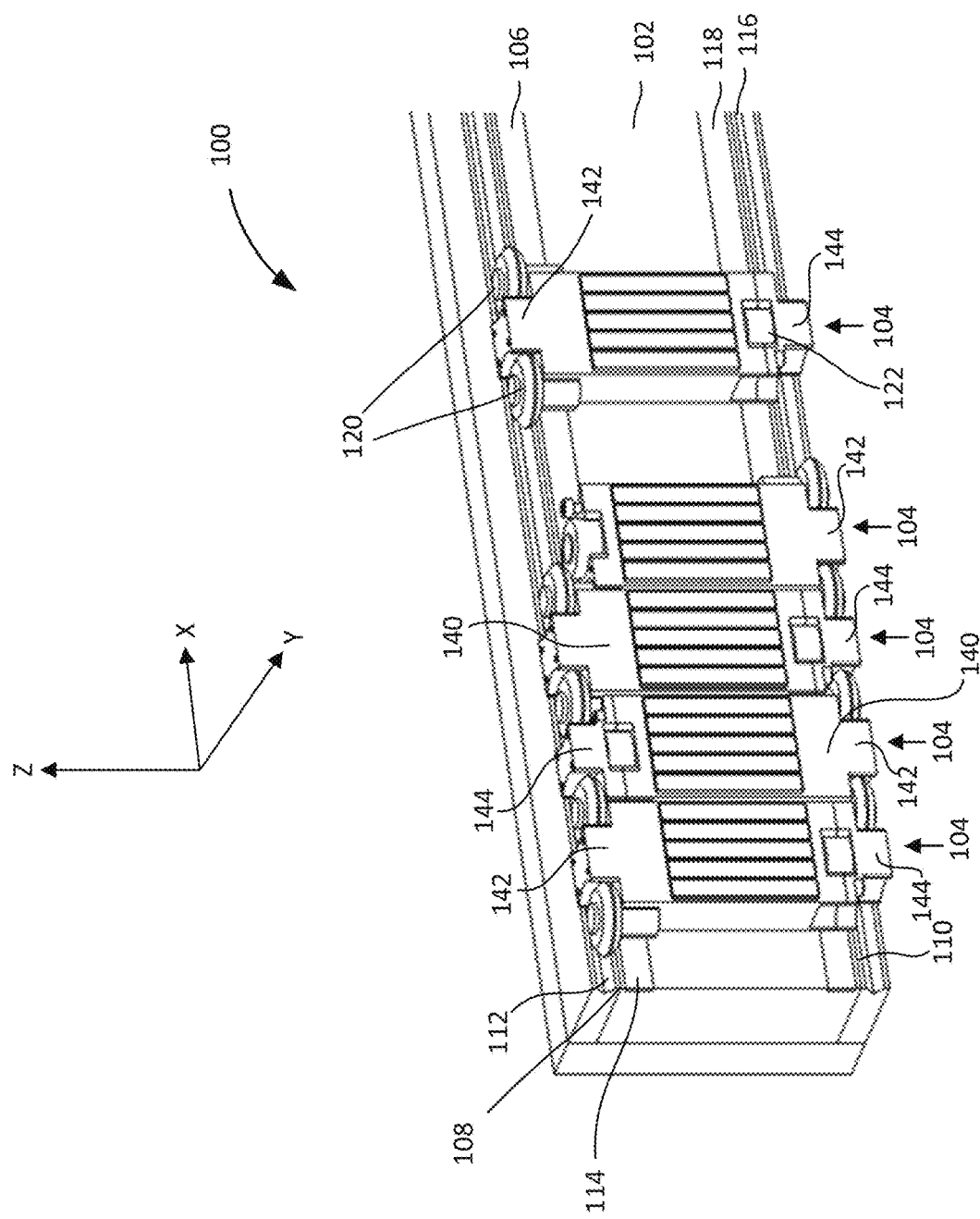
FIG. 1 shows an example track section of a conveyor system.

FIG. 1 illustrates a conveyor system 100 having a track 102. The track 102 is configured to interact with one or more moving elements 104 (five of which are illustrated) which are configured to ride or travel along the track 102. Some of the principles of operation of a similar track 102 are described in more detail in U.S. Pat. No. 8,397,896 to Kleinikkink et al., which is hereby incorporated herein by reference.

In some embodiments, track 102 may be composed of a plurality of track sections (not shown) which are mechanically self-contained and separable from one another so as to be modular in nature. In this case, the track sections may be mounted on a support (not shown) so as to align and abut one another in order to form the track 102. In order to be modular, each track section may house self-contained electronic circuitry for powering and controlling the track section.

The conveyor system 100 includes a track surface that produces a magnetic force for moving the moving element 104 along the track 102. The magnetic force also captures the moving element 104 on the track 102. The magnetic force is created by the interaction of the magnetic flux created by coils (not shown) embedded under the track surface and magnetic elements of the moving element 104. The magnetic force can be thought of as having a motive force component for directing movement of the moving element 104 along an X axis 130 (direction of travel) on the track 102, a capturing force component to hold, on a Y axis 132 (laterally), the moving element 104 on the track 102 and in spaced relation to the track surface. There is also a Z axis perpendicular to both the X and Y axes. In at least some conveyor systems, the motive force and the capturing force is provided by the same magnetic flux.

The track surface includes a first guide rail 108 and a second guide rail 110 configured to support the moving element 104. The first and second guide rails 108, 110 are configured such that the moving element 104 may be removed from the track surface when the magnetic force is overcome. The magnetic force is overcome, for example, where a user pries the moving element 104 away from the track surface. In an alternative, the moving element 104 may be removed from the track surface where the magnetic force is reversed, reduced, or removed.

The first guide rail 108 supports at least some of the moving elements 104 horizontally while it may support other moving elements 104 horizontally and vertically. In particular, the first guide rail 108 has a "V" shaped profile 112 adjacent to a smooth surface 114 with a flat profile. It is intended that the "V" shaped profile 112 will support and guide some of the moving elements 104 horizontally and vertically while the flat profile will support other moving elements horizontally. The second guide rail 110 has a similar structure in that it includes a "V" shaped profile 116 (in this case, on the outer side or bottom of the guide rail) and a smooth flat surface 118 (in this case, on the inner side or on top of the "V" shaped profile). It will be understood that rails having an alternate shape (i.e. other than "V" shaped) may be used with corresponding wheels or bearings on the moving elements.

Each moving element 104 has at least one shaped bearing or wheel 120, wherein the profile of the wheel is configured to correspond to the shaped profile of the first and second guide rails. Each moving element 104 further includes at least one flat wheel 122. In this embodiment, the moving element 104 includes a set of shaped wheels 120. It is intended that the dual sets of guide rails 108, 110 allow for the shaped wheels 120 to overlap as between adjacent moving elements. It is intended that, by providing the dual tracks on each guide rail, and allowing the moving elements to have some overlap, the conveyor system 100 may provide a reduced tooling pitch between moving elements. In particular, the tooling pitch is expected to be in a range between 50 mm and 75 mm while the wheels in the moving element include an outer dimension of at least 80 mm.

For a conveyor system without guide rails that enclose the bearings as described herein, the torque that the moving element can handle is generally impacted by i) the pitch or spacing of the supporting wheels (also referred to as "wheel pitch") and ii) the distance the linear motor (or driving element) is away from the guide rails or wheels (also referred to as "rail offset"). In particular, this may be the distance from the centerline of the guide rail/wheels (because they counter the torque) to the centerline of the linear motor (or driving force/thrust). In some cases, this may be the distance the center of mass of the moving element is from the supporting wheels (also referred to as "wheel offset"). In some situations, the friction of the lower wheels may also contribute to taking up some of the torque and could be included in the calculations if necessary. The rail offset and the wheel offset are measured along the Z-axis (described herein). As the longitudinal wheel pitch decreases and/or the rail offset increases, the torque on the bearings/wheels about the Y-Axis increases (the Y-axis is perpendicular to the direction of travel and perpendicular to the track). As this torque on the bearings increases, acceleration, deceleration and payload are constrained to achieve stable motion. A way to evaluate this is the ratio of the wheel pitch to the rail offset. The higher this ratio is the higher the chance of stable motion while maintaining acceleration, deceleration, payload and cantilever at appropriate levels for efficient operation. A ratio of 1:1 and higher may enable stable performance. Ratios lower than 1:2 may constrain performance. Similar concepts apply to the ratio between wheel pitch and wheel offset.

As noted above, the torque that the moving element can handle can be impacted by i) the pitch or spacing of the V-wheels and ii) the distance the linear motor (or driving element) is away from the V-rails. As the V-wheel pitch decreases and/or the distance between the V-rails and the driving element increases, the torque on the bearings about the Y-axis increases (the Y-axis is perpendicular to the direction of travel). As this torque on the bearings increases, acceleration, deceleration and payload are constrained to achieve stable motion. In the present embodiment, the goal is to obtain a ratio of 1:1.

The following provides for an example of how the ratio may be obtained:

With overlapping wheels it has been determined that a ratio of 1:1 can be achieved at a tooling pitch of 50 mm and wheel diameter of 30 mm. This 1:1 ratio enables stable motion at desired performance. A wheel diameter of 30 mm at the 1:1 ratio provides for a more robust operation.

In contrast, if the wheels didn't overlap, the ratio would be approximately 3:5 for a 50 mm tooling plate pitch and 30 mm wheels. This ratio would constrain the maximum torque the moving carrier could handle limiting acceleration, deceleration and payloads below desired levels. In order to obtain a 1:1 ratio without overlapping, wheel diameter would be reduced from 30 mm to 18 mm to achieve a 50 mm tooling pitch.

One of the reasons to maintain a larger wheel diameter is that, at the 30 mm wheel diameter, standard rotary bearings can still be used. As an example, bearings of the size "10 mm ID/19 mm OD/5 mm height" can be used. This is at the lower end of standard rotary bearing sizes that are cost effective with multiple options available for shielding, sealing and payload ratings. Bearings for smaller wheels, such as 18 mm diameter, become more delicate, are not as robust for industrial applications, have higher contact stresses and have fewer options for sealing and shielding. These are typically magneto bearings with lower payload ratings. Smaller diameter wheels also generally don't roll over rail joints as well as larger wheels. So in addition to the poor stability ratio, the resulting smaller wheels can also constrain performance and reliability.

FIG. 1 illustrates an embodiment with a single flat profile wheel but it would be understood that a moving element with a set of flat wheels could also overlap with adjacent moving elements.

In this embodiment, the moving elements 104 can be oriented in pairs, such that the wheels with the shaped profile of the first moving element are located on the first guide rail and the wheels with the shaped profile of the second moving element are located on the second guide rail. This pairing system allows for the flat profile wheel of the first moving element to be located on the second guide rail and the flat profile wheel of the second moving element would be located on the first guide rail. Generally, each moving element 104 has a body 140 shaped to allow the wheels 120, 122 of an adjacent moving element 104 to overlap. In this embodiment, the body 140 has a rectangular shape with a first support projection 142 between the wheels 120, and a second support projection 144 near the wheel 122. As shown, each moving element can be inverted compared to the adjacent moving element. Accordingly, the second projection 144 of one moving element is located between the wheels 120 of two adjacent moving elements in an overlapping arrangement.

The wheels, bearings, shafts and other mechanical components are intended to be robust and can operate at high performance and reliability while the conveyor system achieves a compact tooling plate pitch of approximately 75 mm or lower, approximately 50 mm or lower, approximately 25 mm or lower, including any intervening pitches.

Figure 2:
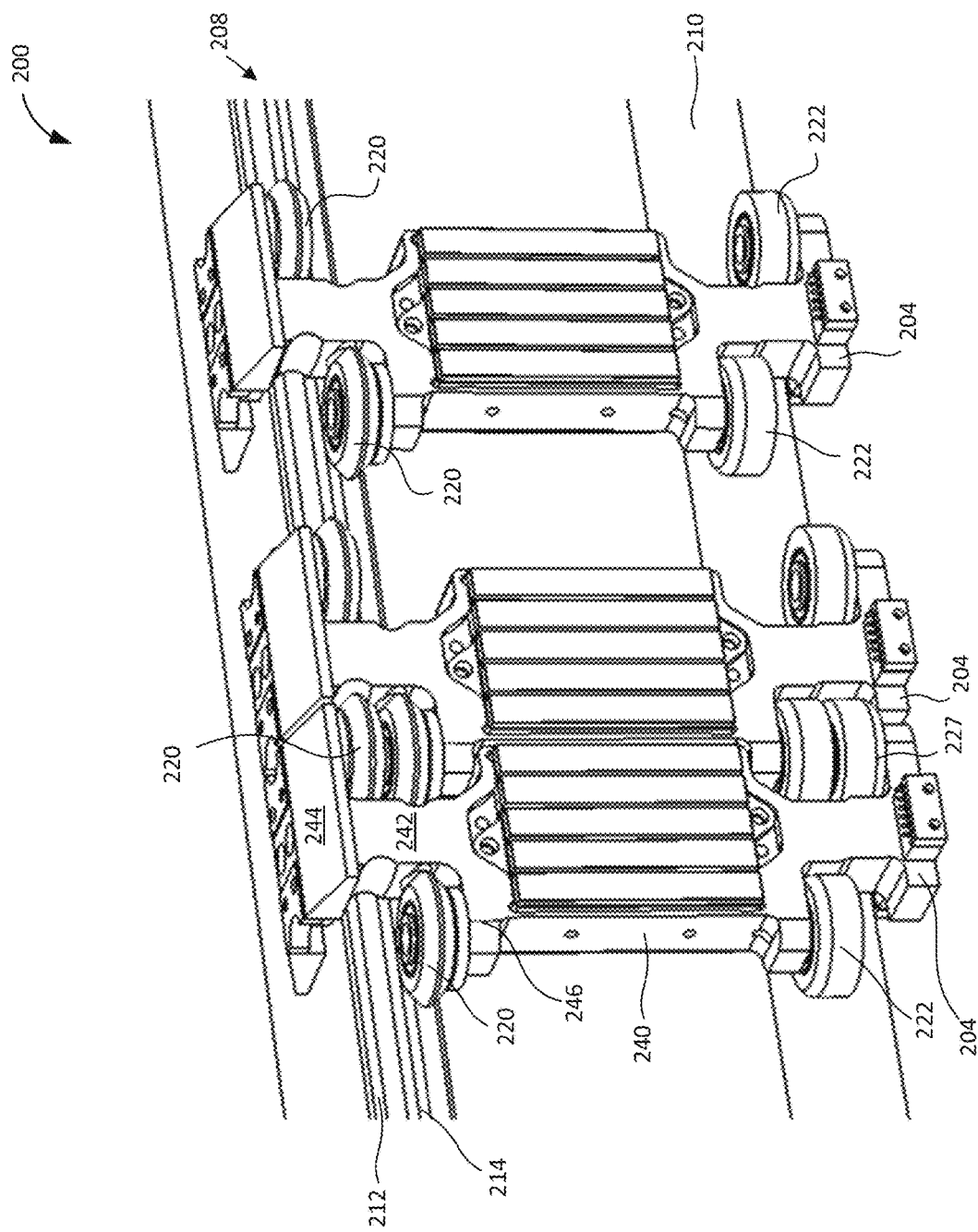
FIG. 2 shows another example of a track section of a conveyor system.

FIG. 2 illustrates another embodiment of a conveyor system 200 and moving elements having a reduced tooling pitch. In this embodiment, a first guide rail 208 may include two shaped portions 212 and 214 that are adjacent to each other and in this case, at a top side of a track. A second guide rail 210 may be a flat rail provided opposite to the first guide rail 208, in this case, at the bottom of the track 202. The second guide rail is intended to be sufficiently wide to allow the guide rail to accommodate two offset wheels or bearings.

The moving element 204 may include two sets of wheels or bearings. The first set of bearings 220 rides on the first guide rail 208. The first set of bearings 220 has an edge profile that corresponds to the profile of the first guide rail 208. In this embodiment, the first set of bearings 220 has a "V" shaped profile that matches the opposite "V" shape profile of each of the portions 212 and 214 of the first guide rail 208. The first set of bearings 220 may alternately have a "U" shaped profile or another appropriately shaped profile intended to support the moving element 204 along a Z axis. It is intended that the first set of bearings 220 may be offset to allow one bearing to be accommodated in the first portion 210 of the first guide rail 208 and a second bearing to be accommodated in the second portion 214 of the first guide rail 208.

The second set of bearings 222 rides on the second guide rail 210. The second set of bearings 222 is intended to have an edge profile that corresponds to the profile of the second guide rail 210. In an embodiment, the second set of bearings has a flat profile (e.g., a flat wheel) that matches the flat profile of the second guide rail 210. The second set of bearings 222 may include two offset bearings which may roll a bit higher or lower on the second guide rail 210 to adapt to any non-parallelism with the first guide rail. In some cases, the second set of bearings 222 may be a single bearing centrally located on each moving element and configured to engage the second guide rail 210.

In this example embodiment, the moving elements 204 may all be oriented in the same direction yet continue to overlap with neighboring moving elements on either side. For example, the moving element 204 has a body 240 with a support projection 242 and an overhang 244 with one wheel 220 supported below the overhang 244. The body 240 also has a shoulder 246 with the other wheel 220 supported above the shoulder 246. The wheel 220 on the overhang 244 of one moving element 204 overlaps the wheel 220 on the shoulder 246 of an adjacent moving element 204. As the offset wheels allow for the overlap of the moving elements, the conveyor system 200 is able to achieve a reduced tooling pitch, which may be in a size range as noted herein.

In the embodiment shown in FIG. 2, the moving element 204 has two offset "V" shaped bearings 220 and two offset flat bearings 222. The two flat bearings 222 and the two V-shaped bearings 220 (four bearings in total) may provide increased stability in rotation about X, Y and Z axes. This may allow payloads mounted to the moving element 204 that have higher cantilever than a three-bearing configuration. With four bearings 220, 222, the center of gravity of an added payload that is mounted to the moving element 204 may also be shifted farther away from the track while maintaining stability.

It will be understood that overlapping profiled bearings and/or overlapping moving elements may require a dual shaped guide rail. Manufacturing tolerances in a dual shaped rail may cause some precision variability over a single common shaped rail. In some cases, having both shaped portions on the same guide rail (as in FIG. 2) may make manufacturing to acceptable tolerances easier than having a shaped profile on each of separate guide rails (as in FIG. 1). Having both shaped profile portions on the same rail may also make joint alignment easier as both shapes will be aligned together. Further, there may be reduction in stack up tolerance by having both shaped profile portions close together and on the same side of the motor.

Figure 3:
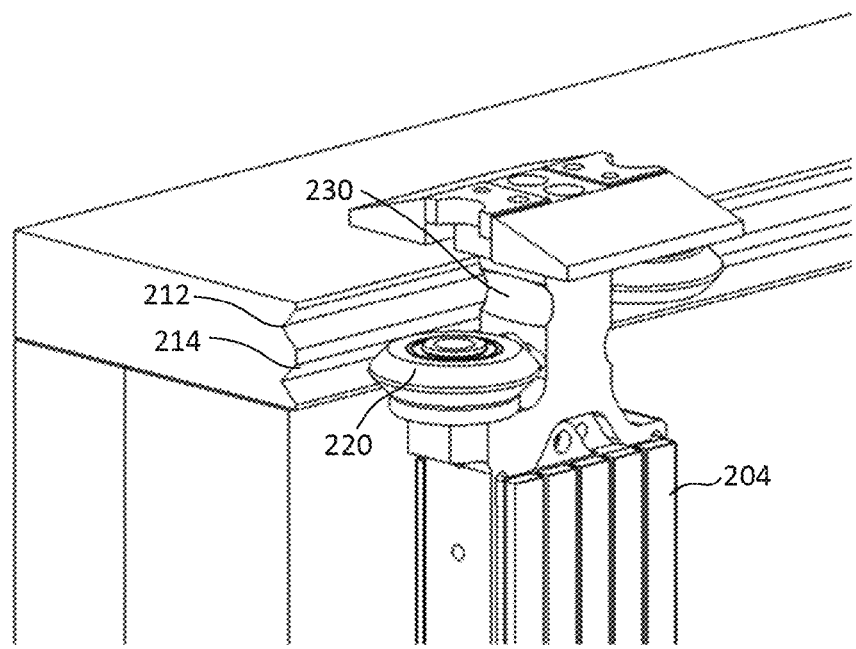
FIG. 3 illustrates an example of guide rails that may be used with the track section illustrated in FIG. 2.

FIG. 3 illustrates the first guide rail of FIG. 2 in further detail. Allowing for the overlapping bearings or wheels is intended to provide for a smaller tooling pitch while enabling a bearing solution that can be sized to handle the forces and demands of a linear motor conveyor. Having dual portions in at least one guide rail is intended to allow for the bearings/moving elements to overlap.

As shown in FIG. 3, the moving element 204 may include a set of offset shaped bearings 220 configured such that the shaped bearings overlap with a neighboring moving element and its bearings. The moving element may further include an indent 230 (such as a groove, or the like), intended to provide further accommodation for the bearing of the neighboring moving element. It is intended that having dual shaped rails may provide increased stability over a single shaped rail.

It will be understood that the embodiments shown in FIGS. 1 and 2 provide different methods of overlapping the bearings and/or moving elements in order to bring the moving elements closer together and thus reduce tooling pitch while maintaining the stability of the moving elements on the track without adding guide rails for enclosing or otherwise holding the moving element onto the track.

Figure 4:
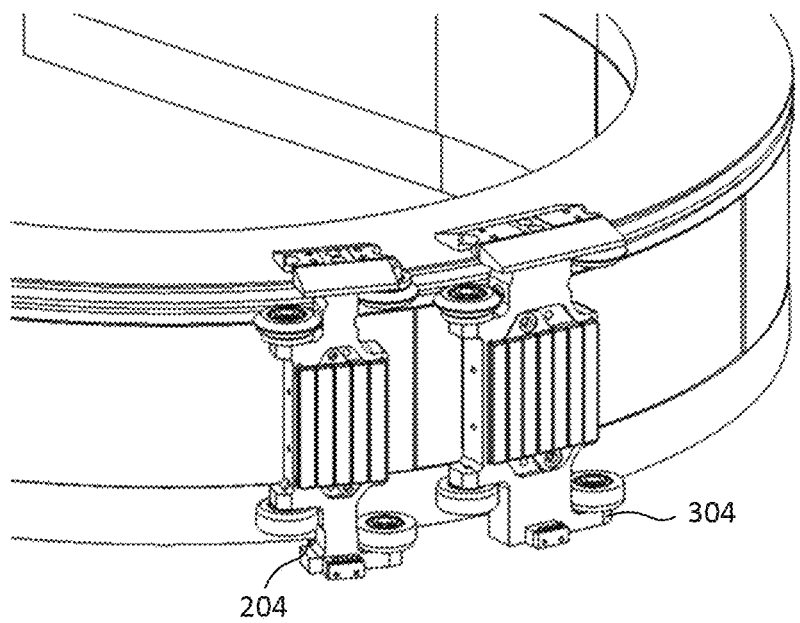
FIG. 4 illustrates a curved track section of a conveyor system such as that of FIG. 2 with a plurality of moving elements.
Figure 5:
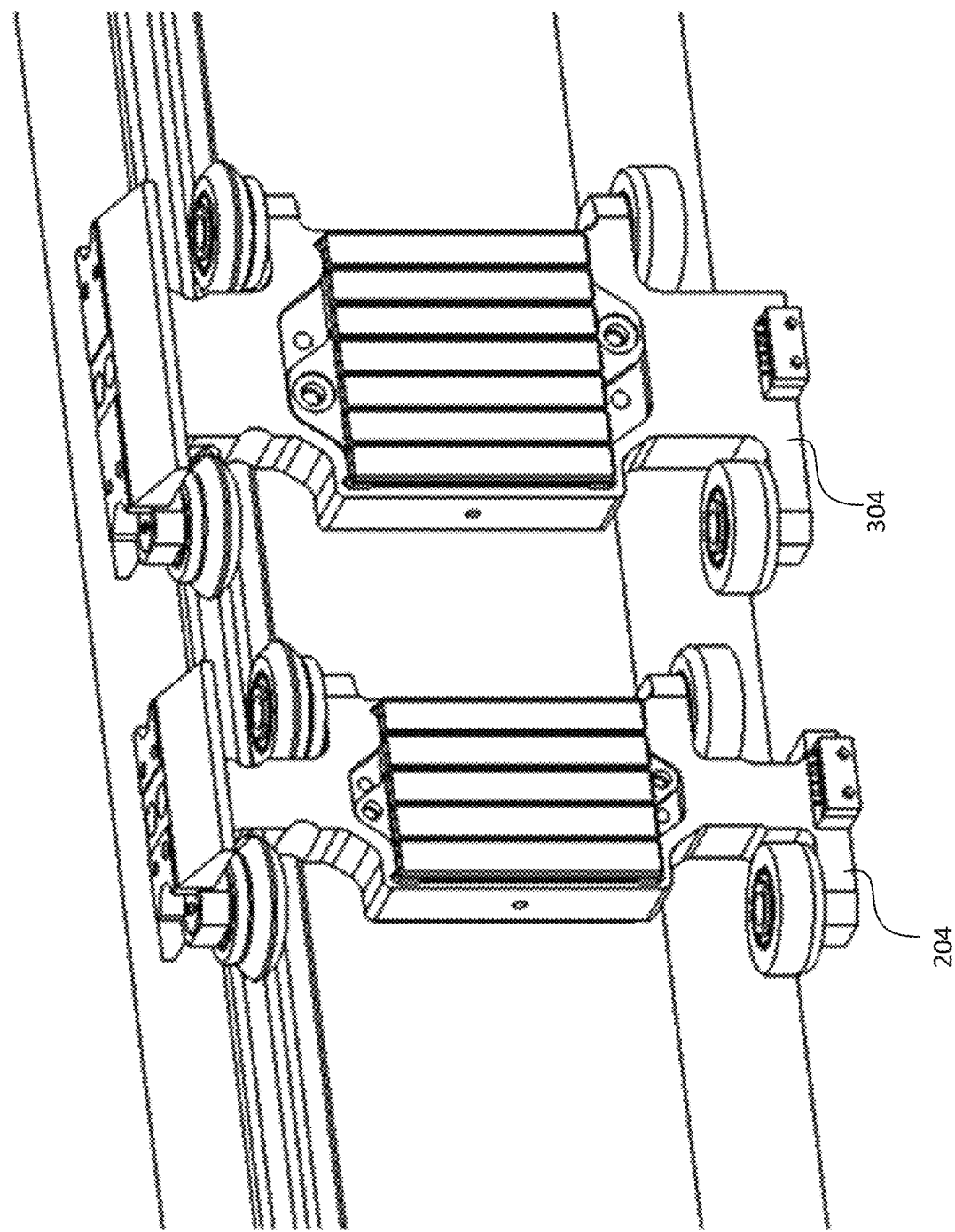
FIG. 5 illustrates a track section with two different sizes of moving elements.

FIGS. 4 and 5 illustrate an alternative embodiment that is intended to support different bearing spacing on the moving elements with common rails and common linear motors. In particular, FIG. 4 illustrates a common curved rail while FIG. 5 illustrates a common straight rail. A linear motor conveyor may be used for a wide range of applications wherein some applications may benefit from a smaller tooling pitch of for example, approximately 75 mm or less, while other applications may benefit from a larger tooling pitch, for example, for wider parts or multiple parts per moving element. Accommodating various dimensions of moving elements may further provide for increased stability to support loads of varying weights and/or loads with varying cantilevers. Conventional mechanical solutions that support wheels with both narrow and wider spacing can be problematic on curves as the motor to magnet gap (that is, distance between the motor on the track and the magnet on the moving element, sometimes called the "air gap" or "magnet gap") changes with the wheel spacing of the moving element. It can be a costly solution to provide multiple curved motors and/or curved rail profiles for various wheel spacings (and the related tooling pitches).

FIGS. 4 and 5 illustrate a first moving element 204, which is configured to provide for a smaller tooling pitch and a second moving element 304 which is configured to provide for a larger tooling pitch. Each moving element includes a first set of shaped bearings 220 and a second set of flat bearings 222. Each set of bearings 220 and 222 are offset on each moving element and are intended to overlap with neighboring moving elements. The first moving element 204 may be a smaller width than the second moving element 304.

In FIG. 4, the rail curve profiles may be determined to allow for adequate clearance for the magnet gap for the moving element with the widest wheel gap 304, while the moving element 204 with the narrower wheel profile may have a larger magnet gap. For example, a magnet gap of between 1 mm to 3 mm is typically acceptable with a smaller gap being better for performance. The lower end of the range is determined by the precision and tolerances of the manufacturing while the higher end relates to the ability of the track to keep the moving element engaged and operating correctly when subject to higher forces. As long as the magnet gap is maintained at an appropriate distance, a range of sizes of moving elements may be used on the same rail curve.

In another case, the curve profile of the linear motor conveyor track may also be optimized to share the magnet gap variation and the guide rail profiles may be adapted to a common motor. In yet another case, the motor may be shifted relative to the guide rails to provide for a magnet gap for different bearing spacing. For example, for an "out" turn the motor may be shifted out relative to the guide rails as the spacing between the bearings decreases.

In yet another case, common motor and rail parts may be used whenever the curve radius exceeds a predetermined threshold and replacement parts may be used in curves where the radius is below the predetermined threshold. In this case where a replacement part is needed, the motor, guide rails, or both may be replaced in the curves with lower radii based on the bearing spacing of the moving elements. Replacing parts only on curves with a radius below the predetermined threshold may only be a small subset of the total parts and thus represent a cost savings over replacing the complete linear motor conveyor or having multiple conveyors each with a single size of moving elements. This type of solution is intended to be available for "in" turns, "out" turns or other curves on the track sections.

In general, as the air gap gets larger, there can be a compromise because both the magnetic thrust to move the moving element and the magnetic attraction to hold the moving element on the track can be negatively impacted. It will be understood that similar considerations can be used to determine the appropriate magnet gap for other types of rails and bearings.

In another case, the profile of the magnets of the moving element may be modified based on the spacing of the set of bearings. In particular, magnets closer to the centerline could be recessed on moving elements with a wider bearing spacing to reduce magnet gap variations on the outside curves. Although this solution may provide benefit for out turns, it may not aid in in turns so may only be feasible in linear motor conveyor systems using out turns.

It is intended that the solutions provided above allow for common linear motor parts to support various bearing spacing and sizes of moving elements. The motor curve profiles may be a compromise between smallest and largest spacing to optimize the magnet gap. It is further intended that the rail curve profile may also be a compromise between the smallest and largest bearing spacing to optimize the magnet gap. Further the profile of the magnets on the moving element may be modified to optimize the magnet gap. It will be understood that all or a subset of these solutions may be employed.

In some cases, the use of moving elements configured to reduce tooling pitch is still not sufficient to provide an appropriate or desirable pitch between pallets, nests or the like (i.e. a platform to carry a part, workpiece or the like, referred to in embodiments herein as a "nest"), particularly for small parts or items. This issue can also be more difficult for linear motor conveyor systems, which involve high speeds and accelerations, because the size of the moving elements may sometimes need to be larger due to the forces encountered and the like. Further, it may be necessary to provide a variety of potential pitches between nests in a conveyor system depending on the needs of automation stations on the conveyor system or the like. For example, one automation station may work best with a smaller pitch between nests and another station may require that the nests be spaced further apart for any of various reasons such as, for example, a two-up processing by a tool that has a wider pitch. The following embodiments make use of two or more moving elements to provide for various nest pitches.

Figure 6:
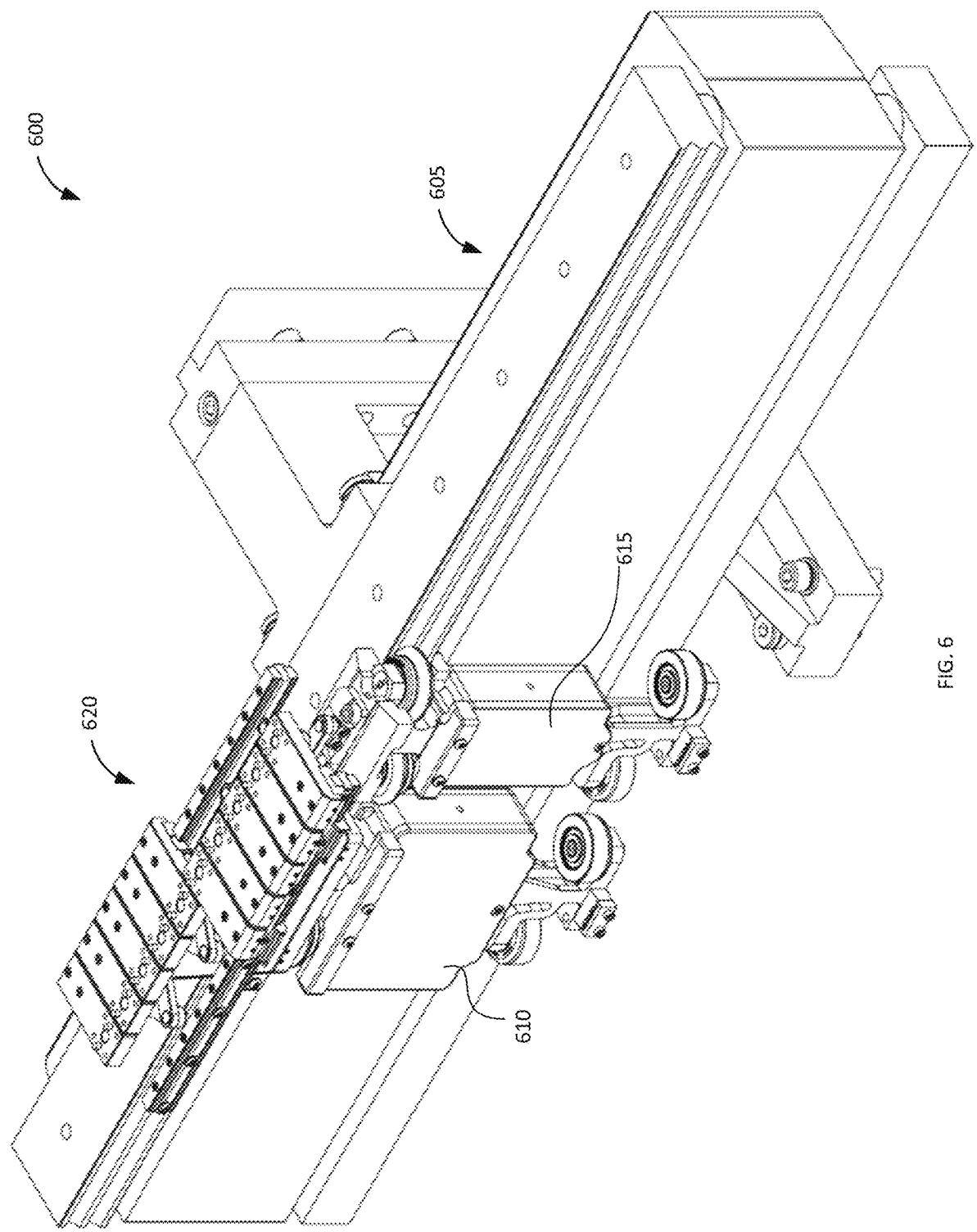
FIG. 6 illustrates a perspective view of a conveyor system with a pitch assembly according to an embodiment herein.
Figure 7:
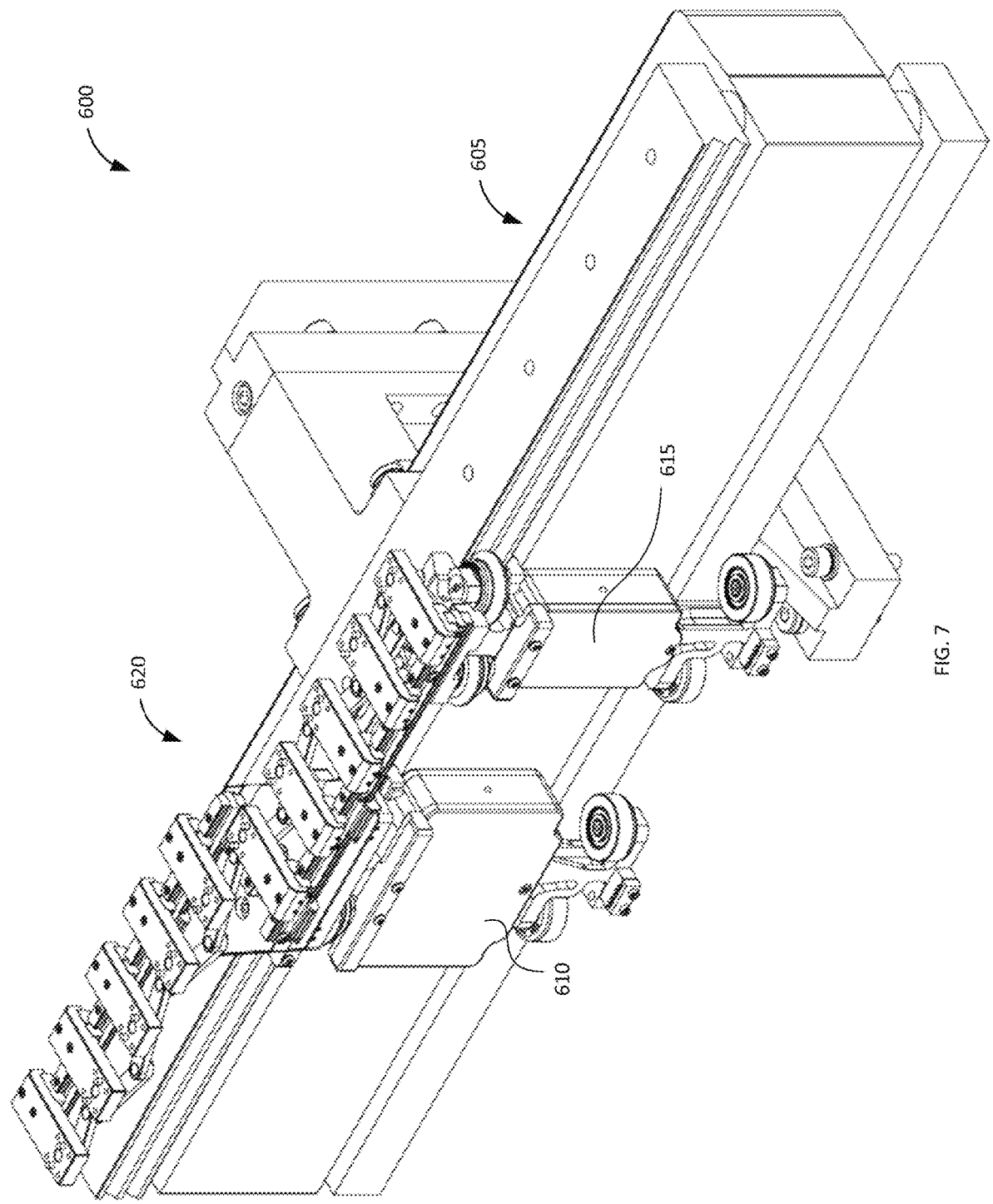
FIG. 7 illustrates a perspective view of the conveyor system of FIG. 6 with the pitch assembly in an open position.

FIGS. 6 and 7 illustrate a perspective view of a conveyor system 600 including a track section 605, moving elements 610, 615 (referred to herein as a primary moving element 610 and a secondary moving element 615, but which are generally interchangeable) and a pitch assembly 620 according to an embodiment. In FIGS. 6 and 7, the conveyor system 600, track section 605, and moving elements 610, 615 are similar to those illustrated in FIGS. 2-5 but it will be understood that various embodiments of conveyor systems, track sections, and moving elements can be implemented together with the embodiments of the pitch assembly described herein. In FIG. 6, the pitch assembly is in a closed configuration as the two moving elements 610, 615 are close together. In FIG. 7, the pitch assembly is in an open configuration as the two moving elements 610, 615 are separated.

Figure 8A:
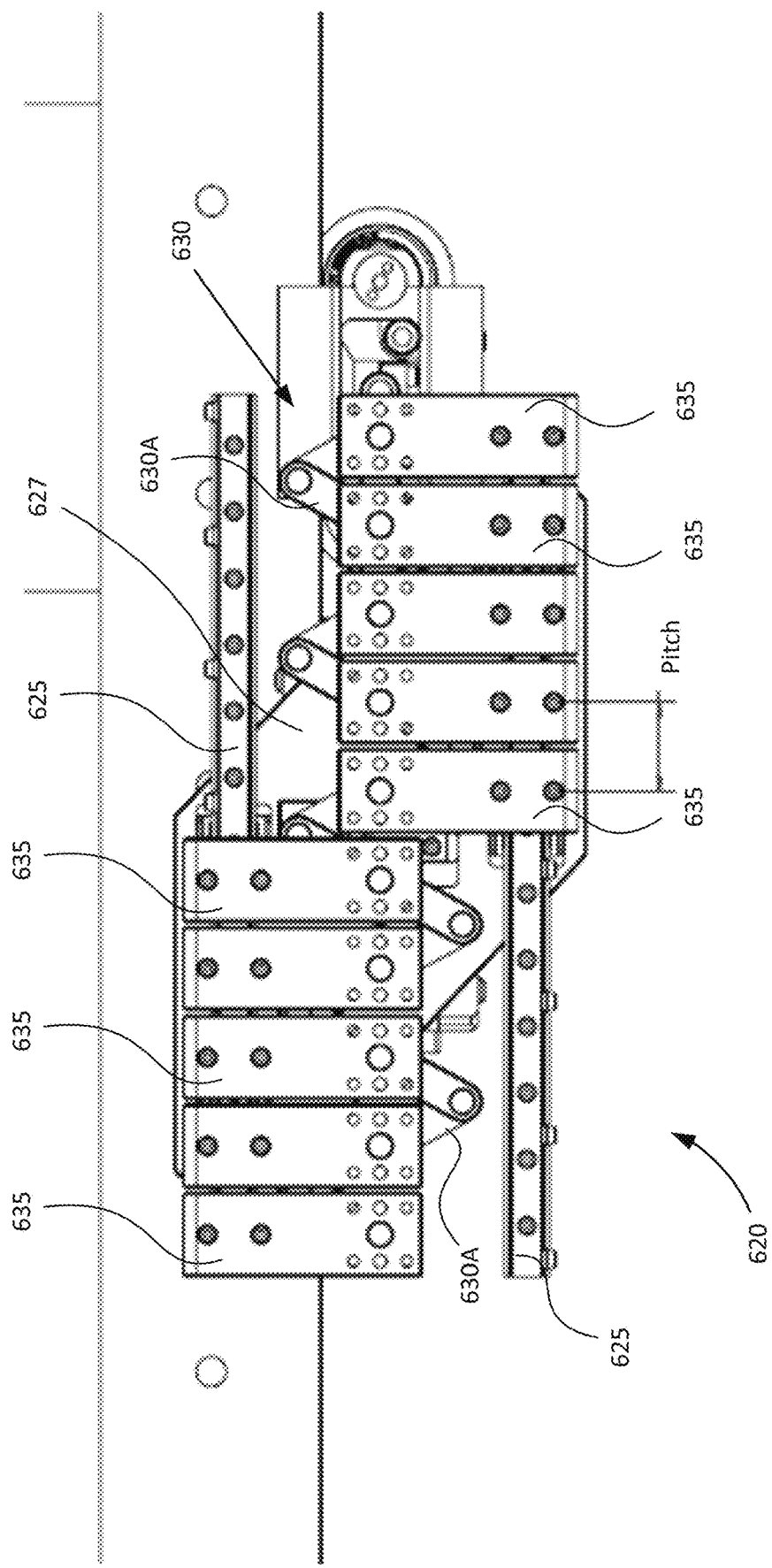
FIG. 8A illustrates a top view of a pitch assembly according to an embodiment.
Figure 8B:
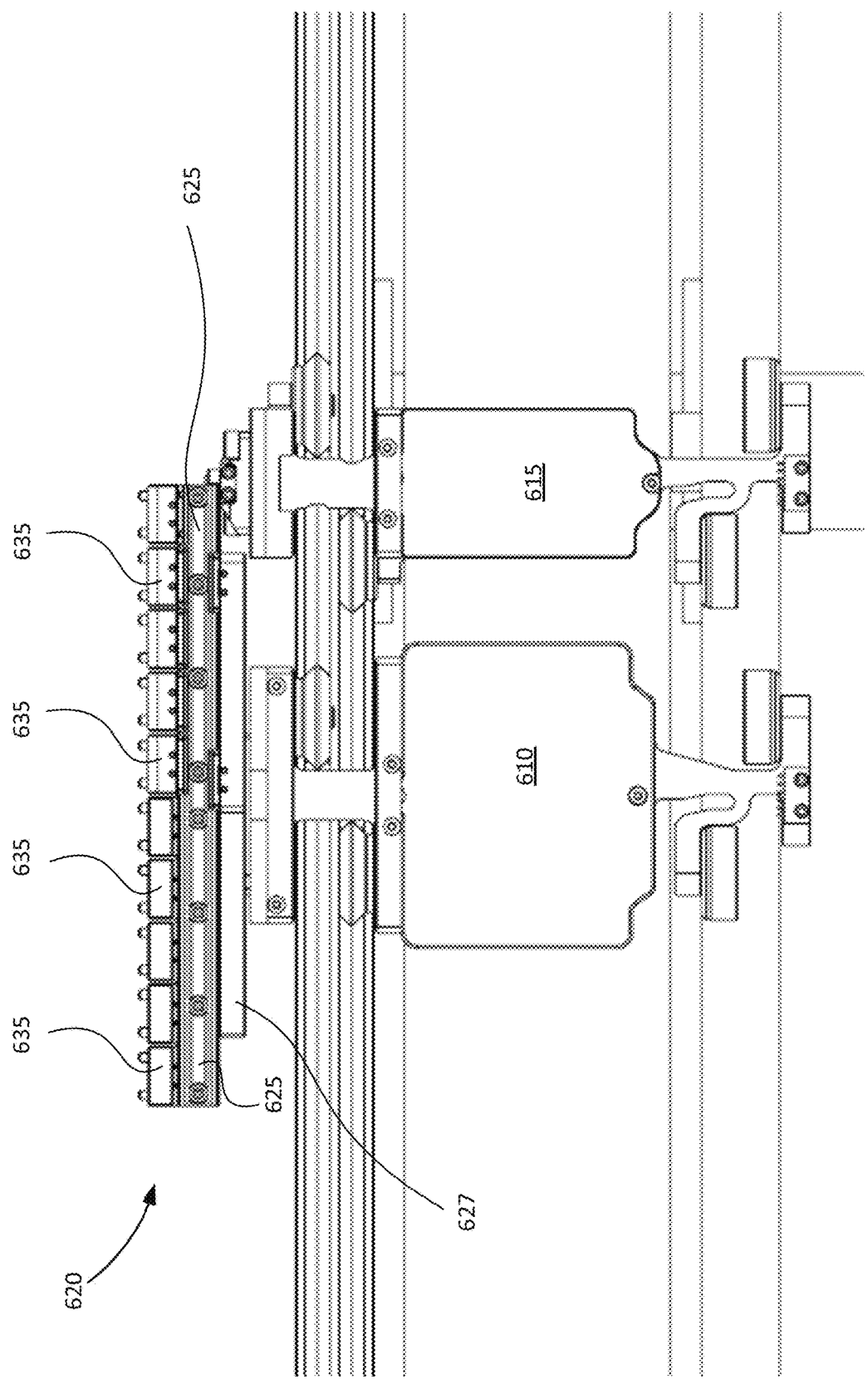
FIG. 8B illustrates a front view of the pitch assembly shown in FIG. 8A.

FIG. 8A is a top view and FIG. 8B is a front view of the pitch assembly 620 of FIGS. 6 and 7 in a closed or minimal pitch arrangement. In this embodiment, the pitch assembly 620 includes two rails 625, a tooling plate 327, a mechanical linkage 630, and a plurality of nests 635. The rails 625 are arranged parallel to each other and slidably connected to the tooling plate 327. The mechanical linkage 630 is positioned between the rails 625 and connected with each of the nests 635. The plurality of nests 635 are configured to be supported by and slide in relation to the rails 625. In this embodiment, the nests 635 are offset with a subset of nests 635 provided to each of the rails 625. As shown in FIG. 8A, one particular embodiment has a pitch of 20 mm but this size can be adjusted depending on the particular application of the system.

Figure 8D:
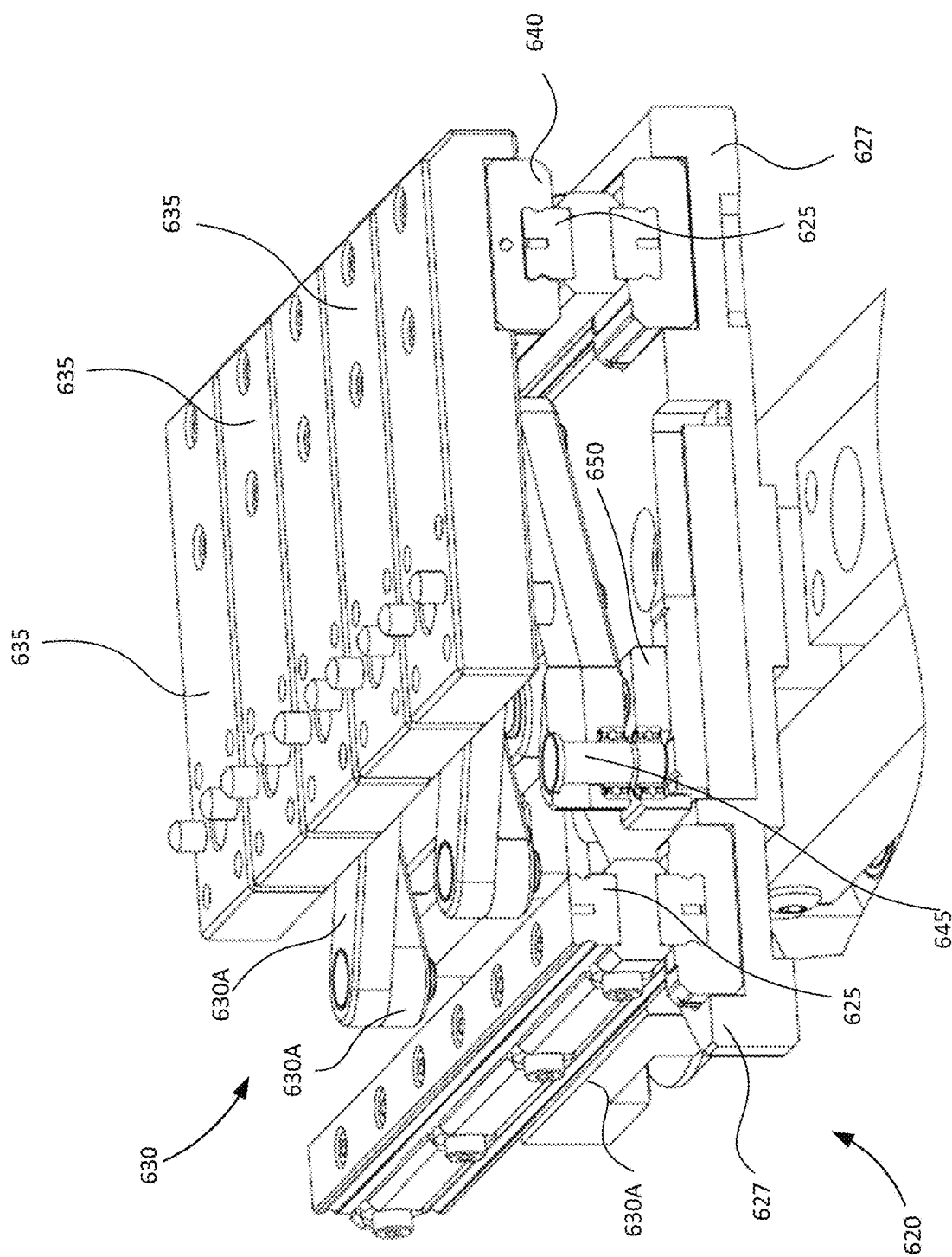
FIG. 8D is a partial cross-sectional view of the pitch assembly of FIG. 8C at a center point of a mechanical linkage.
Figure 8E:
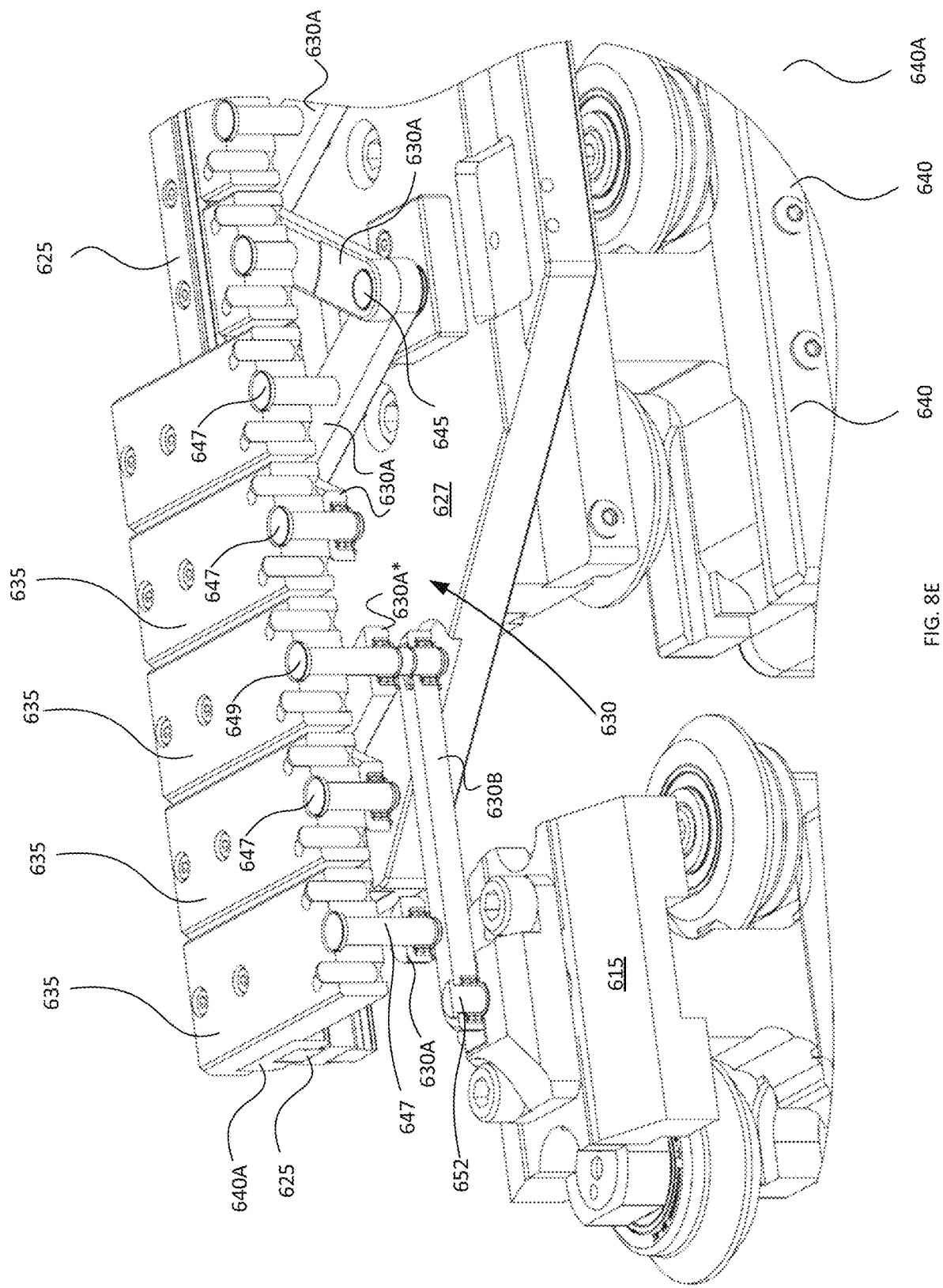
FIG. 8E is a partial cross-sectional view of the pitch assembly 620 of FIG. 8C along the mechanical linkage.

FIG. 8C is a top view of the pitch assembly 620 of FIGS. 8A and 8B with the nests removed. FIG. 8D is a partial cross-sectional view of the pitch assembly 620 of FIG. 8C at a center point of the mechanical linkage 630. FIG. 8E is a partial cross-sectional view of the pitch assembly 620 of FIG. 8C along a center line of the mechanical linkage 630 illustrating the mechanical linkage 630.

As shown in FIGS. 8C to 8E, the mechanical linkage 630 includes a plurality of individual links 630A, arranged in a single-side scissor arrangement (i.e. pivotally attached at the ends), as well as a pivot link 630B, which is connected at or near an end of the mechanical linkage 630 and arranged generally parallel to the rails 625. The rails 625 are slidably mounted on the tooling plate 627 and include nest cars 640 that slidably support the nests 635. An end nest 640A of the nest cars 640 may be fixed to the rail 625 on each rail 625 to cause the rail 625 to slide when appropriate.

As shown in FIG. 8D, the mechanical linkage 630 is supported on the tooling plate 627 by a support pin 645 at a central pivot point of the mechanical linkage 630 that engages with a support car 650 that is slidably mounted to the tooling plate 627. The support car 650 can slide in a predetermined range perpendicular to the rails 625 to allow the mechanical linkage 630 to extend. In some arrangements of the mechanical linkage, the mechanical linkage may be supported on the tooling plate without the need for a support car.

As shown in FIG. 8E, each of the plurality of nests 635 is also pivotally attached to one of the individual links 630A, generally at a center point thereof, via, for example, a pin 647. One individual link 630A* is also pivotally attached to the pivot link 630B, via, for example, a pin 649 and the pivot link 630B is pivotally attached to the secondary moving element 615 via, for example, pin 652.

Figure 9A:
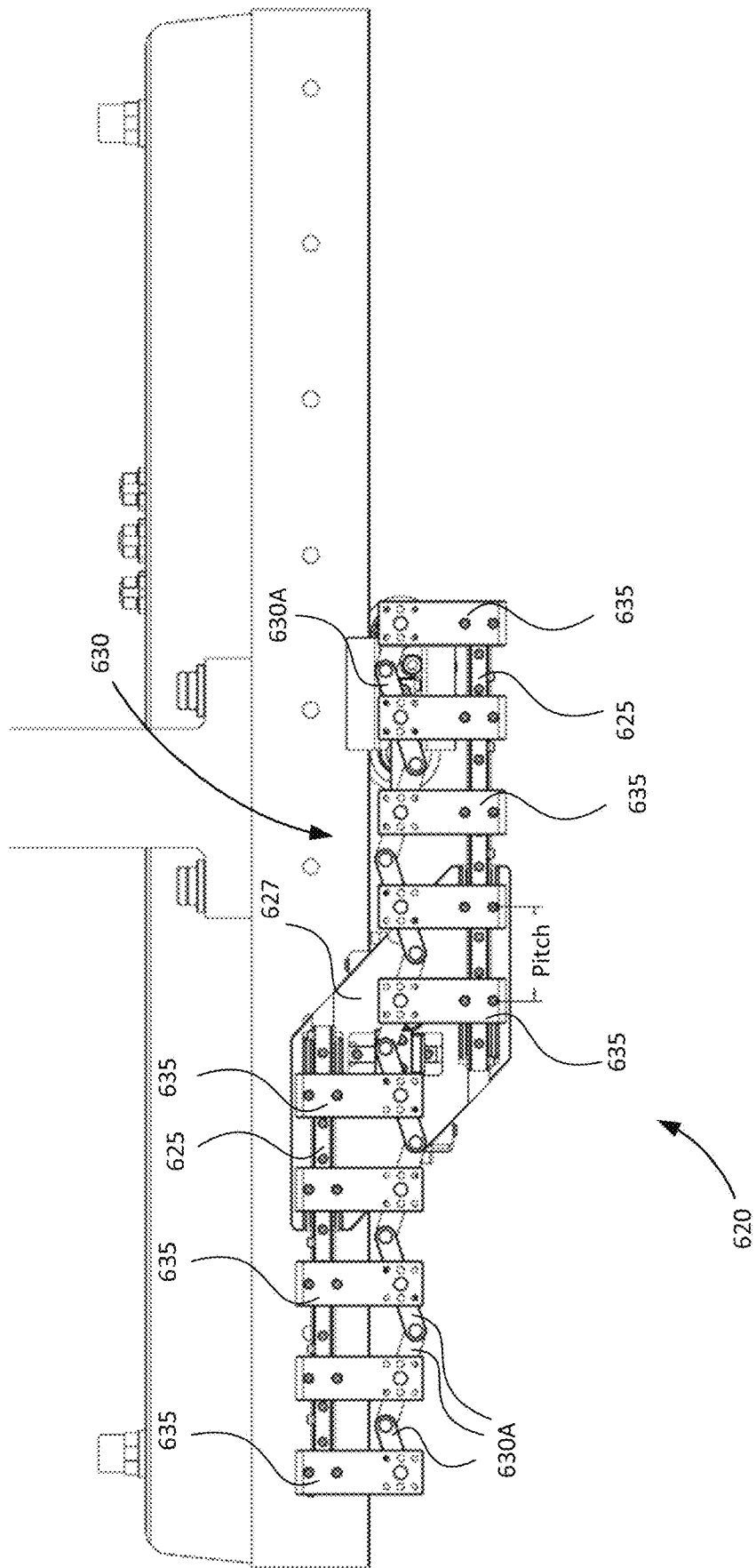
FIG. 9A illustrates a top view of the pitch assembly of FIG. 8A in an open position.
Figure 9B:
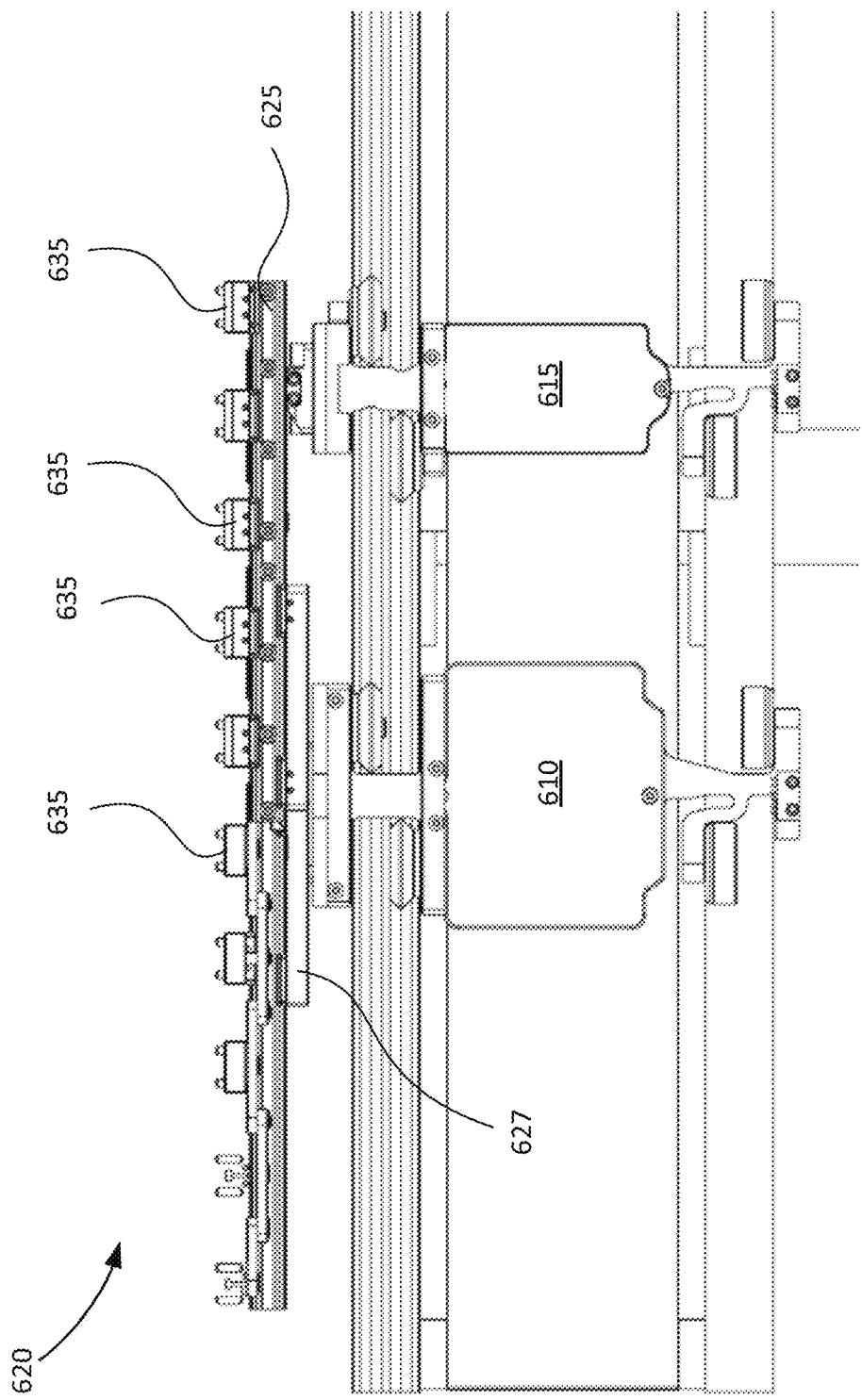
FIG. 9B illustrates a front view of the pitch assembly shown in FIG. 9A.

FIG. 9A is a top view and FIG. 9B is a front view of the pitch assembly of FIGS. 6 and 7 in an open or maximal pitch arrangement. As illustrated, as the moving elements 610, 615 move apart, the mechanical linkage expands as compared to the state in FIGS. 8A and 8B. Conversely, as the moving elements move closer, the mechanical linkage contracts back to the position shown in FIGS. 8A and 8B. As the mechanical linkage expands and contracts, the nests 635 slide along the rails 625 as the related individual links 630A move. In this way, the nests 635 move linearly and the pitch between nests 635 can be adjusted over a range of pitches from the closed position of the mechanical linkage 630 through the open position of the mechanical linkage 630. By independently controlling the moving elements 610, 615, the pitch can be held constant or varied at any time. In FIG. 9A, the pitch is shown as 40 mm, which is a ratio of 1:2 with the pitch shown in FIG. 8A.

Figure 9C:
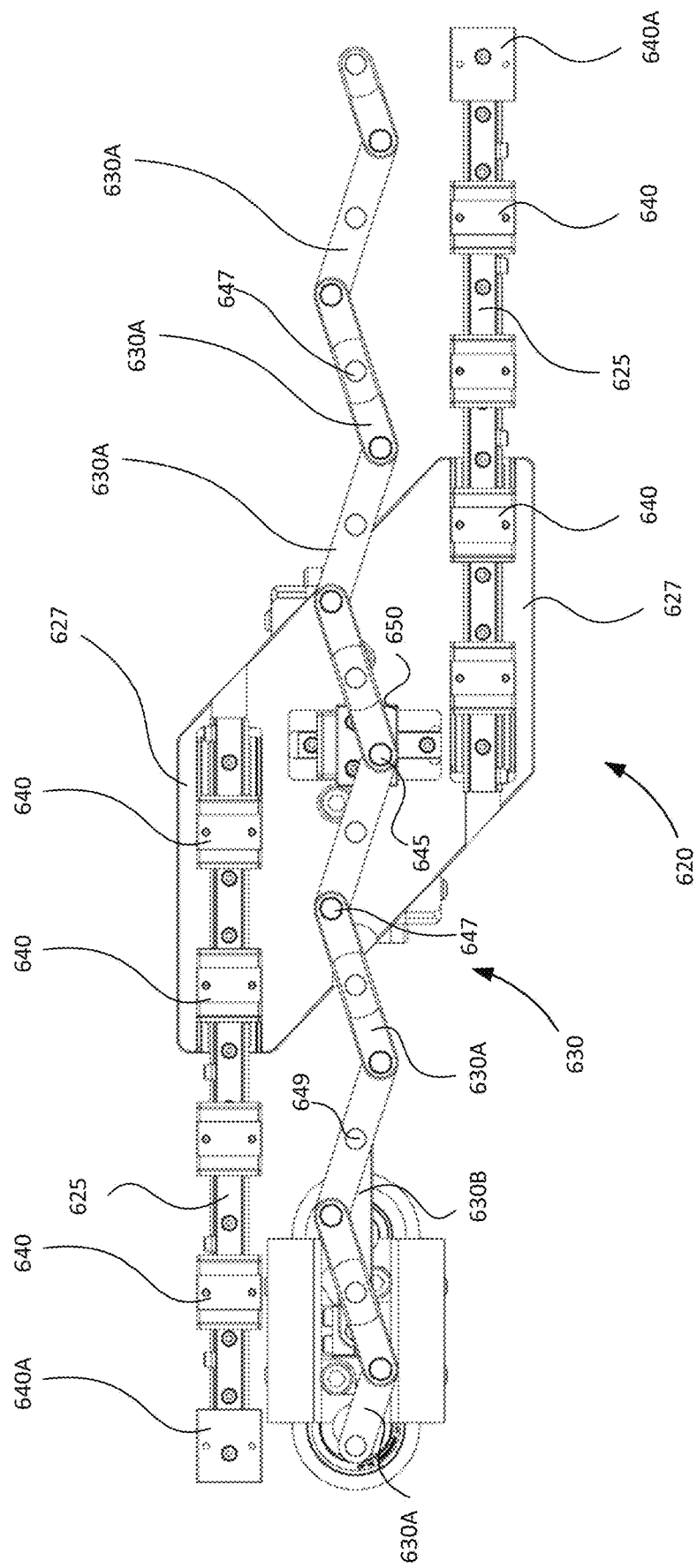
FIG. 9C is a top view of the pitch assembly of FIGS. 9A and 9B with nests removed.

FIG. 9C is a top view of the pitch assembly 620 of FIGS. 9A and 9B with the nests 635 removed. As illustrated, as the secondary moving element 615 moves away from the primary moving element 610, the individual link 630A*, which is connected to the secondary moving element 615, is pulled causing the individual links 630A to pivot at their pivot points and the mechanical linkage 630 extends because the central point of the mechanical linkage 630 is connected to the tooling plate 627 on the primary moving element 610. In this embodiment, the central point of the mechanical linkage slides with the support car to allow the extension. As the mechanical linkage 630 extends, the rails 625 slide along the tooling plate 627 and the nests 635 slide along the rails 625. In this embodiment, at least one nest is attached to the rails to cause the sliding of the rails on the tooling plate 627.

It will be understood that the mechanical linkage may be formed in various configurations. For example, the mechanical linkage may be formed as a two-sided scissor linkage in some embodiments. The use of a scissor linkage allows for a ratio of minimum pitch to maximum pitch of 1:2. Although the mechanical linkage could potentially operate without the rails, the rails assist in having the nests move linearly as the mechanical linkage expands and contracts. It will be understood that, in some embodiments, there may only be one linear rail provided. For example, one linear rail may be provided to support the portion of the mechanical linkage that is not supported by the secondary moving element. In this case, the mechanical linkage may be formed as a two-sided scissor linkage to give support to nests not supported by the rail. Further, the locations at which the mechanical linkage is supported by the secondary moving element and the primary moving element may be adjusted depending on the particular application. Still further, in some embodiments, the pivot link may not be needed, for example, if the moving elements are only on a straight track. However, even on a straight track, the pivot link 630B may provide some flexibility to handle tolerance errors or the like.

Figure 10:
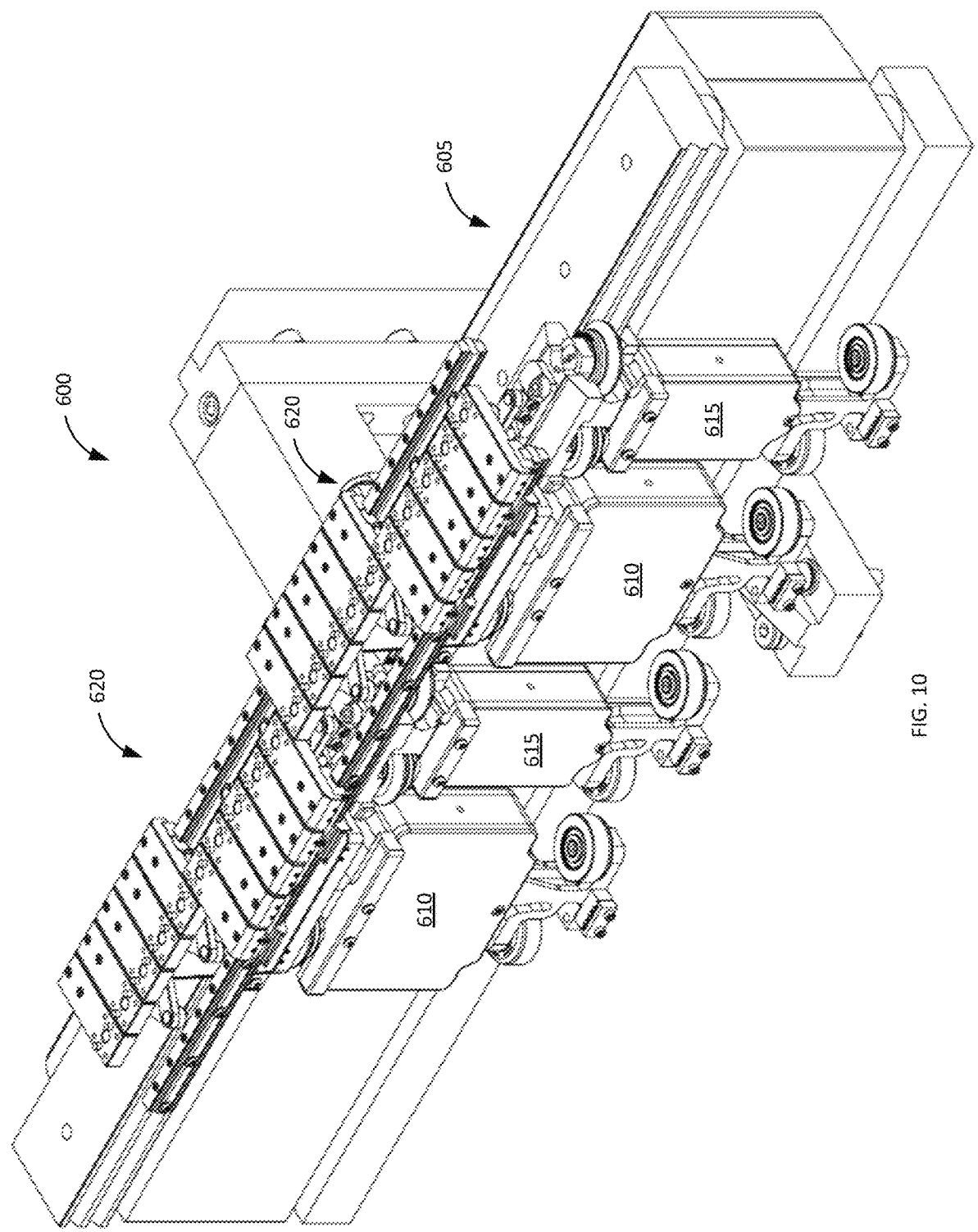
FIG. 10 is a perspective view of the conveyor system of FIGS. 6 and 7 showing two pitch assemblies.

FIG. 10 illustrates the conveyor system of FIGS. 6 and 7 illustrating two pitch assemblies 620, each mounted on two moving elements, arranged side by side on the track section. As shown, the pitch assemblies 620 can abut to maintain a pitch between two different pitch assemblies 620.

Figure 11:
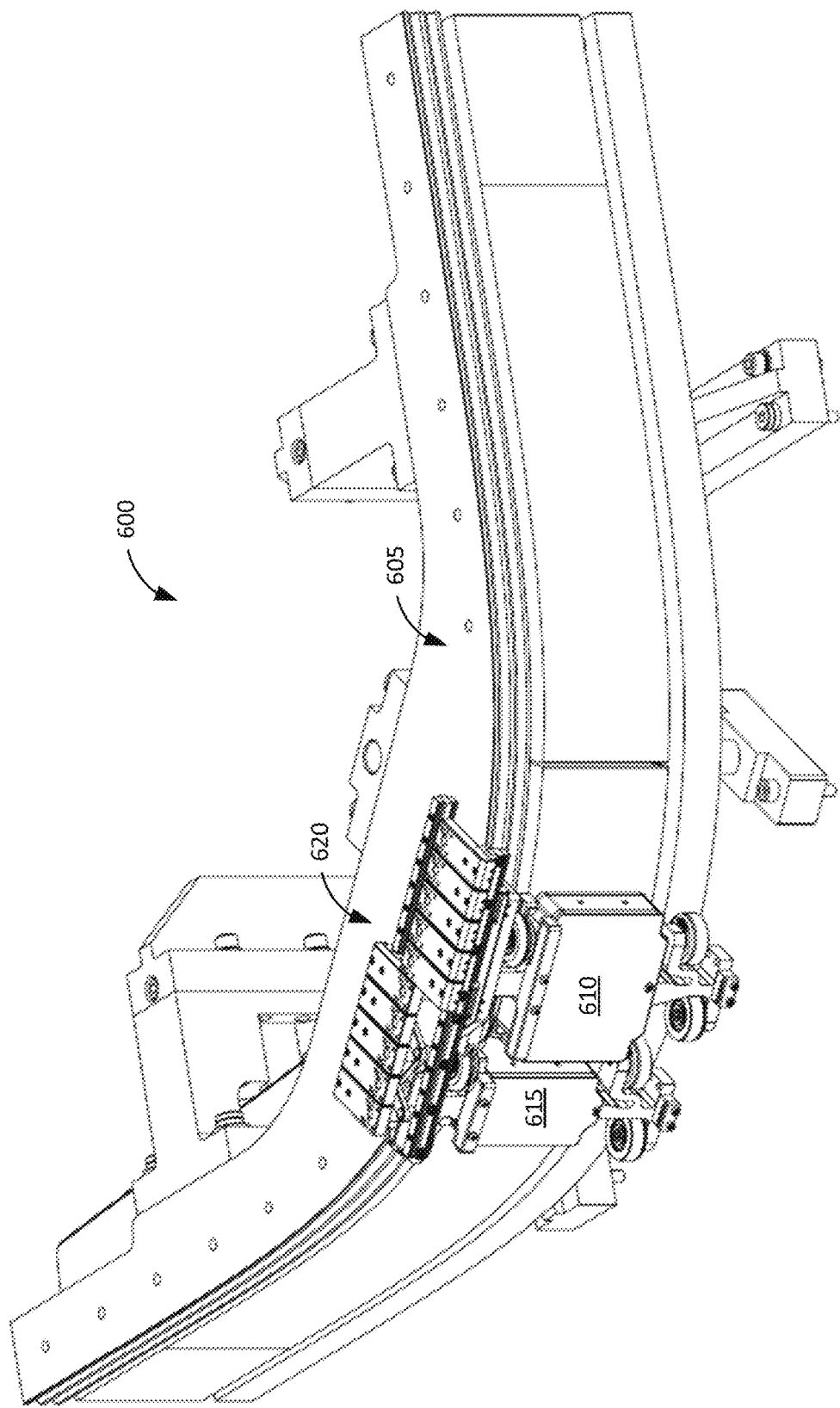
FIG. 11 is a perspective view of a curved track section of the conveyor system with the pitch assembly of FIGS. 6 and 7.
Figure 12B:
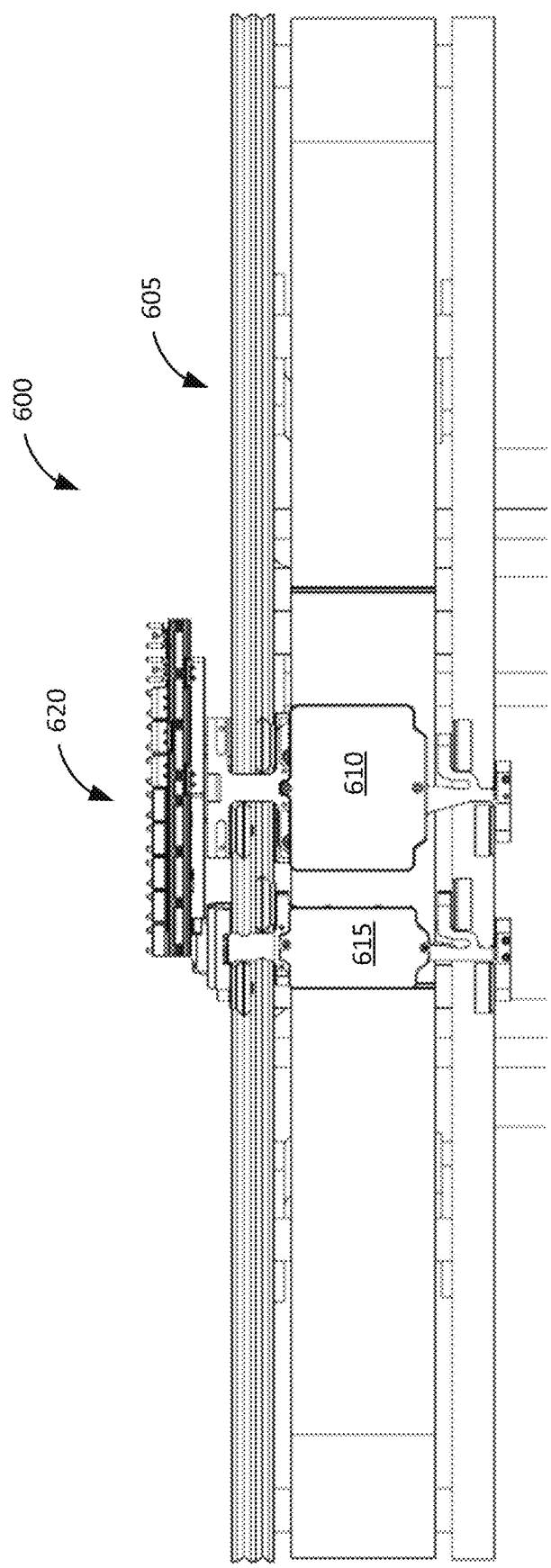
FIG. 12B illustrates a front view of the of the conveyor system of FIG. 11.

FIG. 11 is a perspective view illustrating the pitch assembly of FIGS. 6 and 7 on a curved track section. FIGS. 12A and 12B are a top view and front view illustrating the pitch assembly of FIG. 11. When the pitch assembly travels around a curve, the pivot link 630B (illustrated in FIGS. 8C to 8E and 9C) pivots in relation to the secondary moving element 615 so that the mechanical linkage 630 remains generally linear through the curve. In this way, the moving elements can move through the curve in their ordinary manner while generally maintaining the nests' orientation and predetermined pitch.

Figure 13:
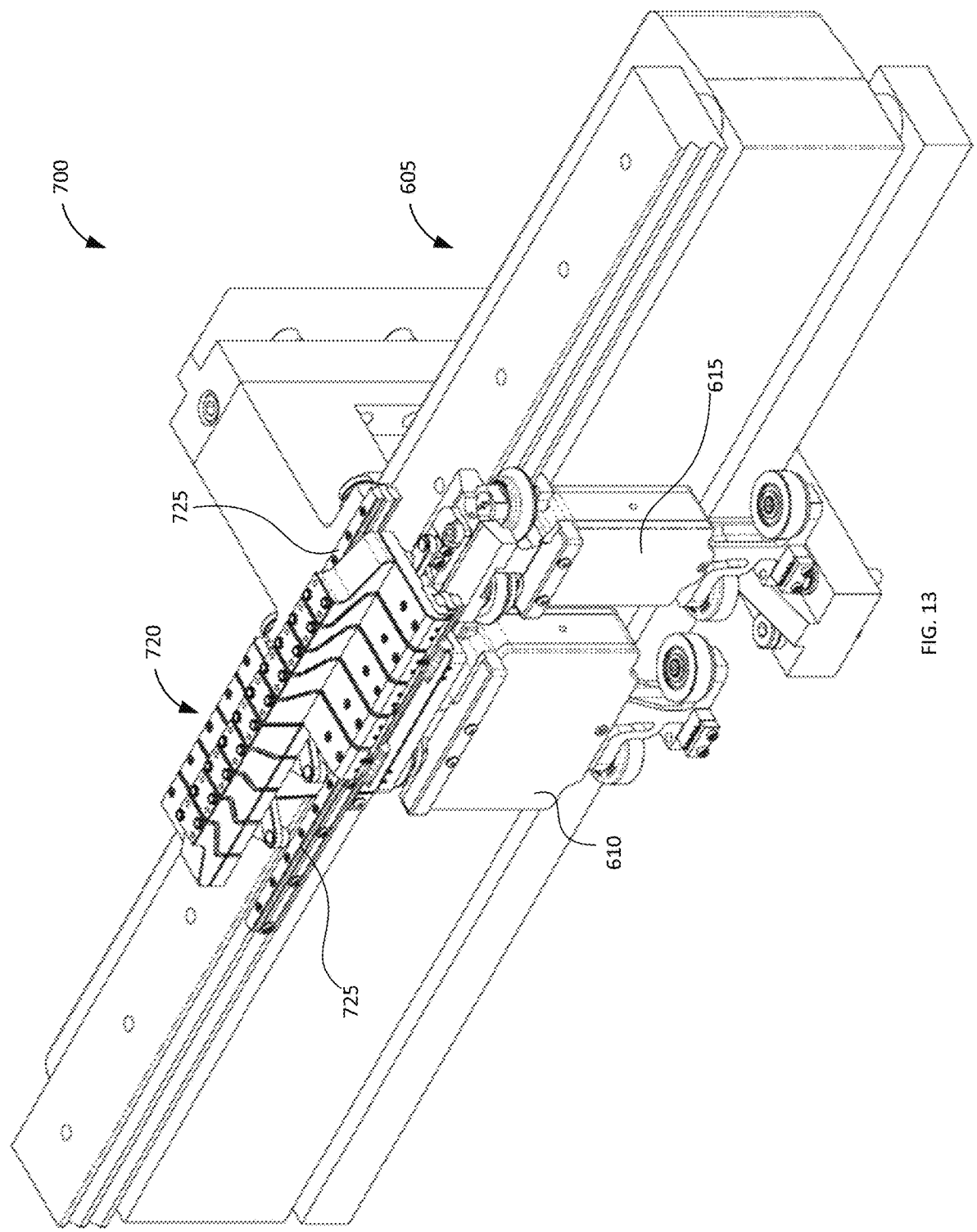
FIG. 13 illustrates a perspective view of a conveyor system with a pitch assembly according to another embodiment.
Figure 14:
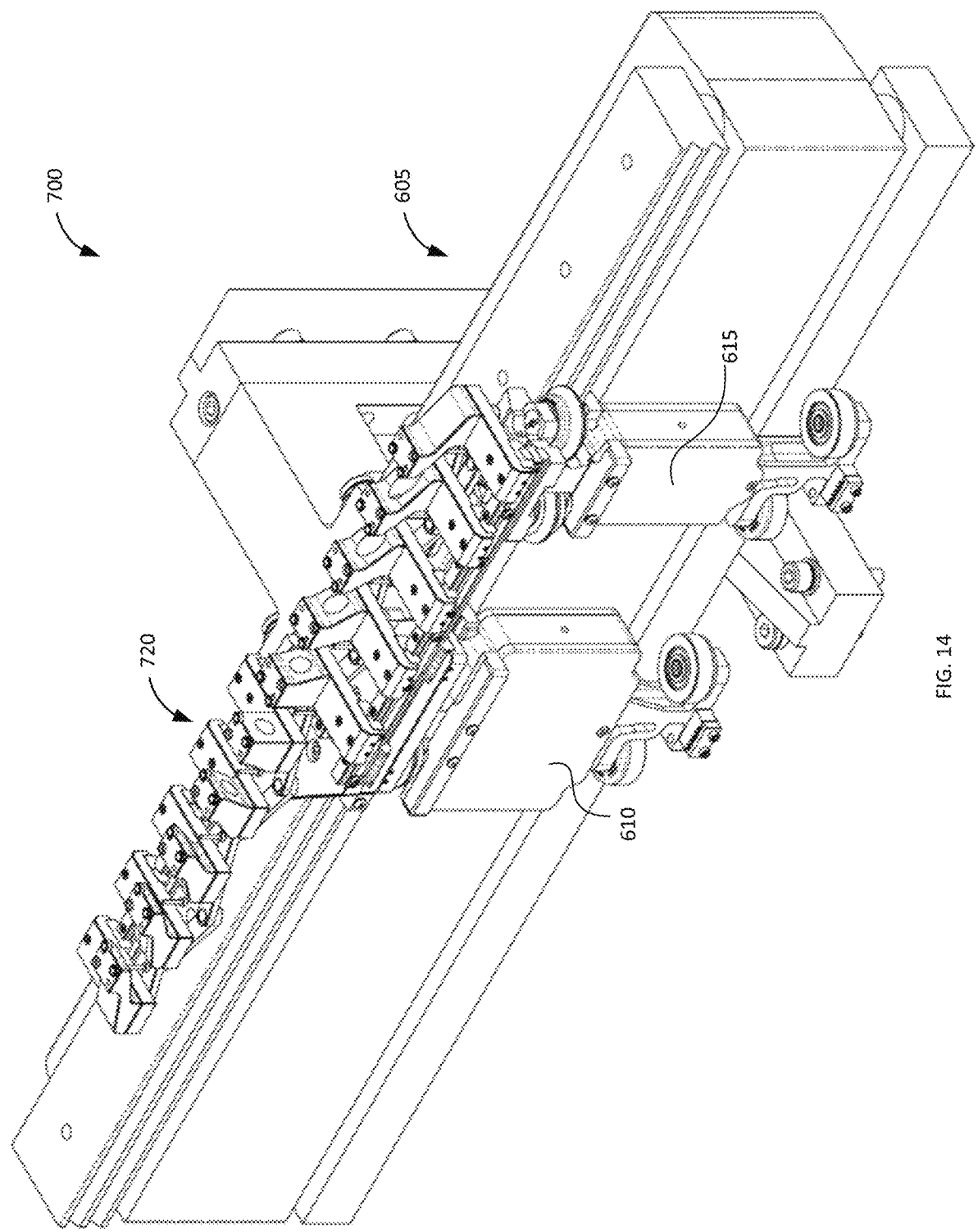
FIG. 14 illustrates a perspective view of the conveyor system of FIG. 13 with a pitch assembly in an open position.

FIGS. 13 and 14 illustrate a perspective view of another embodiment of a conveyor system 700 utilizing a different embodiment of a pitch assembly 720. As with the embodiment of FIGS. 6 and 7, this embodiment includes a track section 605 and moving elements 610, 615 and the same reference numbers will be used. In FIG. 13, the pitch assembly 720 is in a closed configuration as the two moving elements 610, 615 are closer together. In FIG. 14, the pitch assembly 720 is in an open configuration as the two moving elements 610, 615 are moved apart/separated.

Figure 15A:
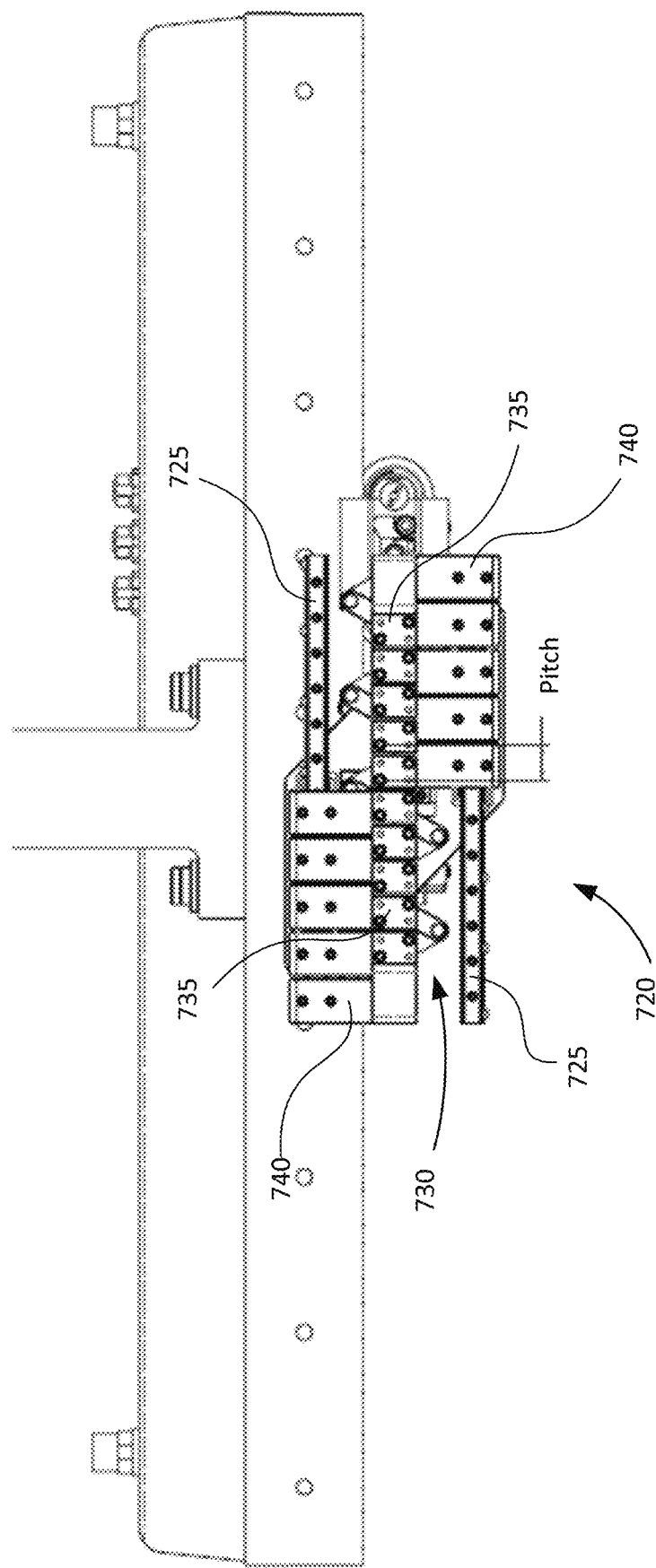
FIG. 15A illustrates a top view of a pitch assembly according to another embodiment.
Figure 15B:
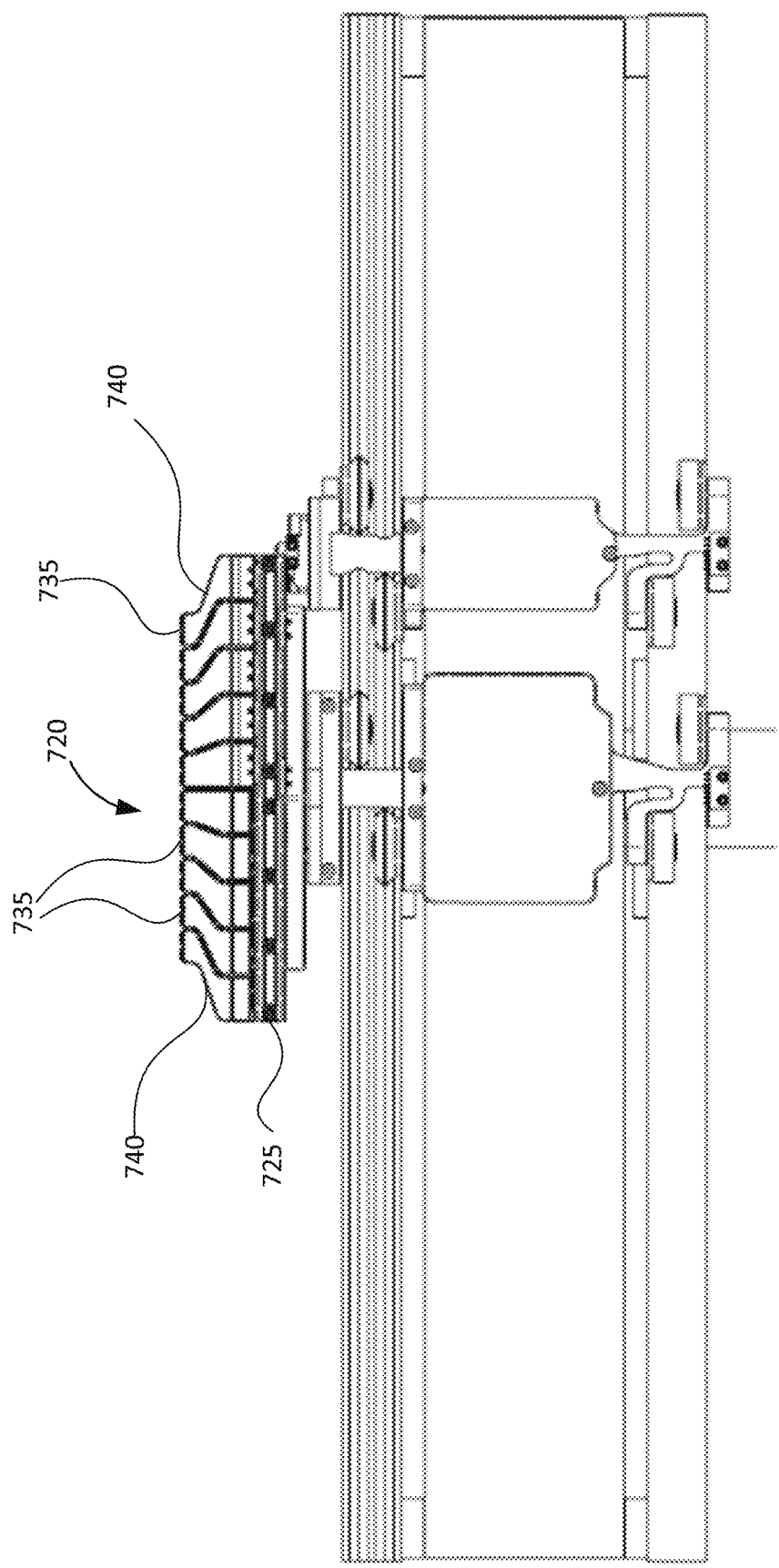
FIG. 15B illustrates a front view of the pitch assembly shown in FIG. 15A.

FIG. 15A is a top view and FIG. 15B is a front view of the pitch assembly 720 of FIGS. 13 and 14 in a closed or minimal pitch arrangement. As with the embodiment above, the pitch assembly 720 includes two rails 725, a mechanical linkage 730, and a plurality of nests 735. The rails 725 and mechanical linkage 730 are arranged in a similar way to those of the embodiment above. However, in the present embodiment, the plurality of nests 735 are provided with adaptors 740 shaped to provide for a further reduced pitch by allowing the adaptors to abut each other via curved profiles. In some embodiments, the nests themselves may have the curved profile that is shown for the adaptors.

Figure 16:
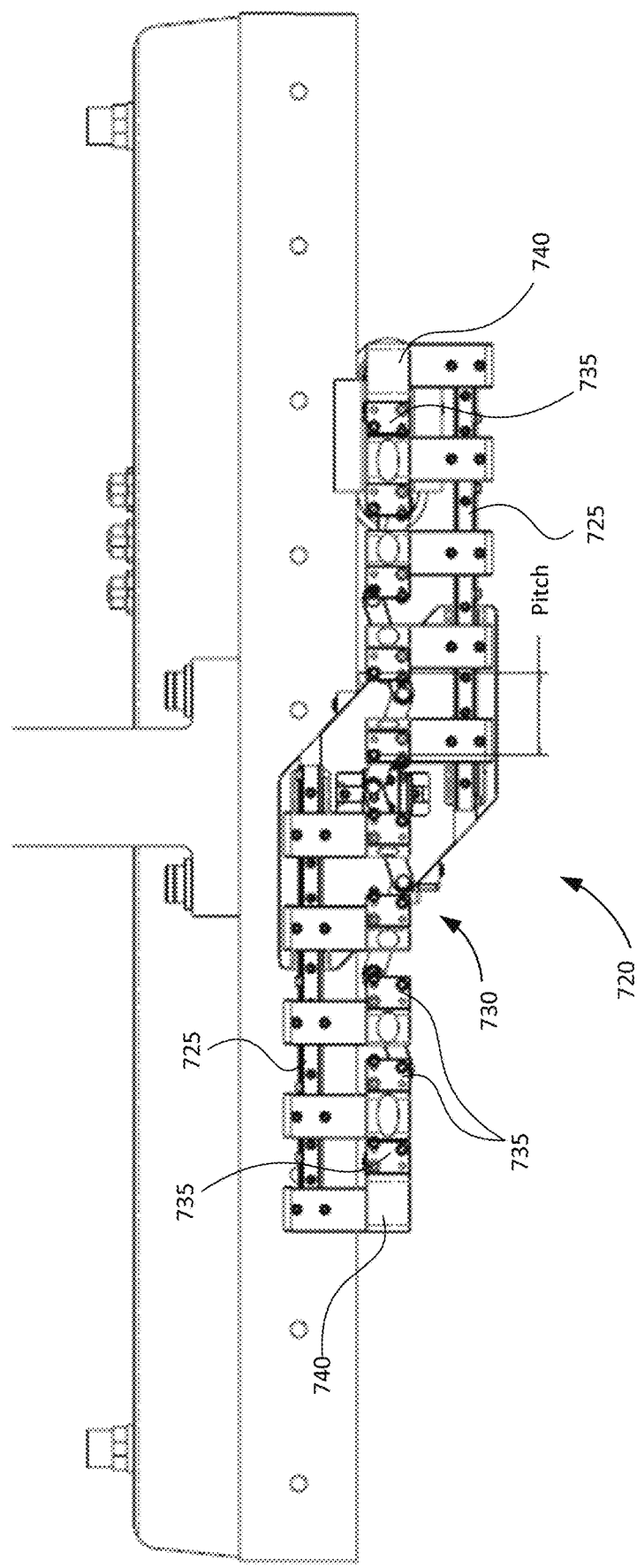
FIG. 16 illustrates a top view of the pitch assembly of FIG. 15A in an open position.

FIG. 16 is a top view of the pitch assembly of FIGS. 13 and 14 in an open arrangement. As with the earlier embodiment, the pitch between nests can be adjusted over a range of pitches by moving the moving elements in relation to each other and thus moving the mechanical linkage from the closed position through the open position.

Figure 17:
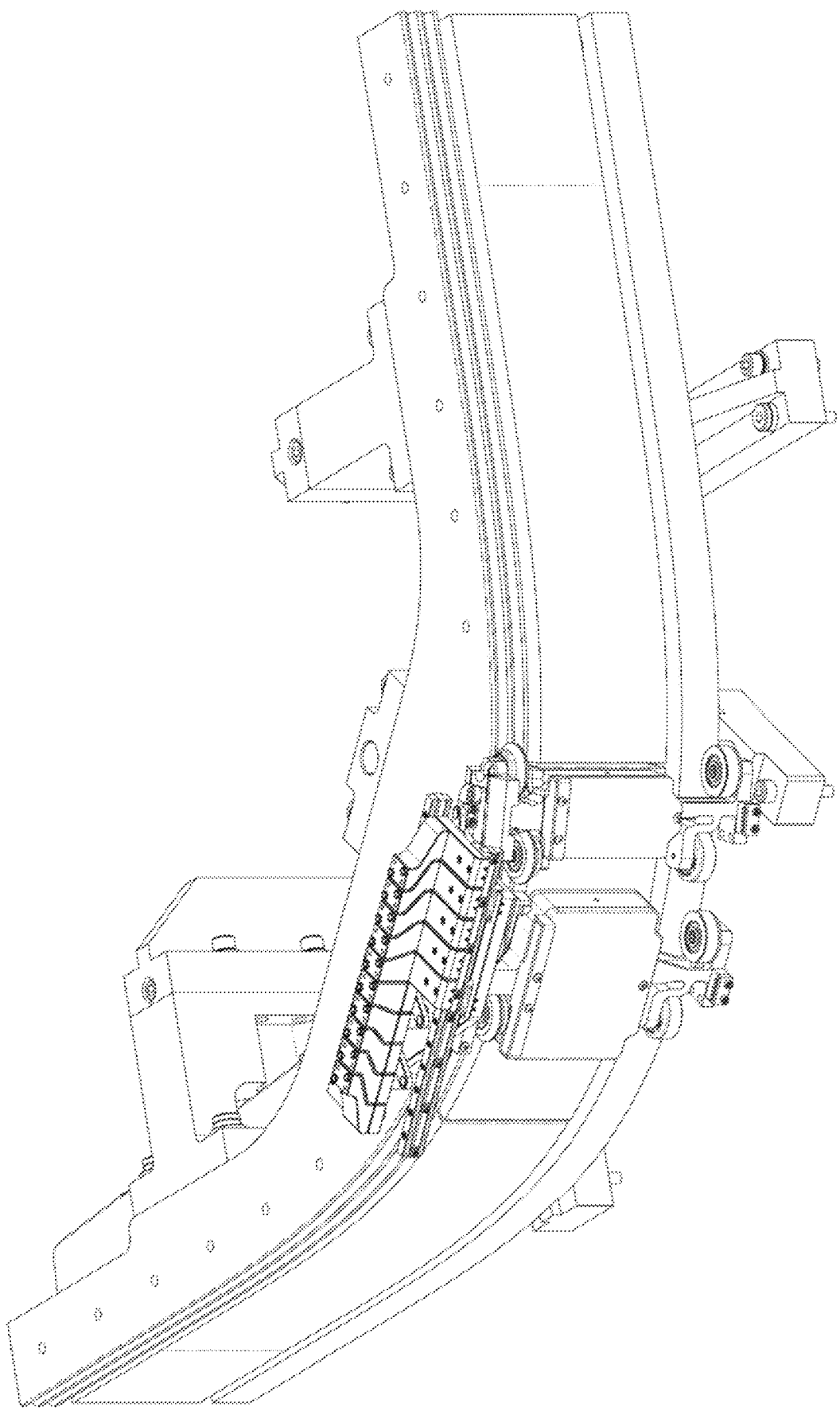
FIG. 17 illustrates a perspective view of a curved track section of the conveyor system with a pitch assembly of FIGS. 13 and 14.

FIG. 17 is a perspective view illustrating the pitch assembly of FIGS. 13 and 14 on a curved track section.

In the preceding description, for purposes of explanation, numerous details are set forth in order to provide a thorough understanding of the embodiments. However, it will be apparent to one skilled in the art that these specific details may not be required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A conveyor system comprising:
   a track;
   at least two moving elements configured to move on the track; and
   a pitch assembly mounted on the at least two moving elements, the pitch assembly comprising:

at least one rail provided on at least one of the moving elements;

a plurality of nests, slidably engaged with the at least one rail, for supporting parts on the at least two moving elements as the at least two moving elements move on the track; and a mechanical linkage connected to the at least two moving elements and to the plurality of nests;

wherein the nests are slidably engaged with the rail to maintain linear motion and connected with the mechanical linkage such that, as the moving elements move closer together, the mechanical linkage contracts and slides the plurality of nests closer together for a reduced pitch between nests and parts, and, as the moving elements move apart from each other, the mechanical linkage extends and slides the plurality of nests apart for an increased pitch between nests and parts.

2. A conveyor system according to claim 1 wherein the at least one rail comprises two rails, which are slidably mounted on at least one of the at least two moving elements.

3. A conveyor system according to claim 1 wherein the mechanical linkage comprises a plurality of links arranged in a single-sided scissors mechanism.

4. A conveyor system according to claim 1 wherein the mechanical linkage comprises a pivot link between one of the at least two moving elements and the remainder of the mechanical linkage to allow the mechanical linkage to pivot in relation to the one of the moving elements.

5. A conveyor system according to claim 1 wherein the pitch assembly further comprises a slidable support connecting the mechanical linkage to one of the at least two moving elements to compensate for contraction and elongation.

6. A conveyor system according to claim 1 wherein a pitch between nests is configured to have a ratio between minimum and maximum pitch of 1:2.

7. A conveyor system according to claim 1 wherein the track is a linear motor track and each of the at least two moving elements comprises at least one magnetic element such that each moving element can be independently moved along the linear motor track by electromotive force.

8. A pitch assembly for a conveyor system wherein the conveyor system comprises at least two moving elements, the pitch assembly comprising:

at least one rail provided on at least one of the at least two moving elements;

a plurality of nests, slidably engaged with the at least one rail, for supporting parts on the at least two moving elements as the at least two moving elements move on the track; and a mechanical linkage connected to the at least two moving elements and the plurality of nests;

wherein the nests are slidably engaged with the rail to maintain linear motion and connected with the mechanical linkage such that, as the moving elements move closer together, the mechanical linkage contracts and slides the plurality of nests closer together for a reduced pitch between nests and parts, and, as the moving elements move apart from each other, the mechanical linkage extends and slides the plurality of nests apart for an increased pitch between nests and parts.

9. A pitch assembly according to claim 8 wherein the at least one rail comprises two rails, which are slidably mounted on at least one of the at least two moving elements.

10. A pitch assembly according to claim 8 wherein the mechanical linkage comprises a plurality of links arranged in a single-sided scissors mechanism.

11. A pitch assembly according to claim 8 wherein the mechanical linkage comprises a pivot link between one of the moving elements and the remainder of the mechanical linkage to allow the mechanical linkage to pivot in relation to the one of the moving elements.

12. A pitch assembly according to claim 8 wherein the pitch assembly further comprises a slidable support connecting the mechanical linkage to one of the at least two moving elements to compensate for contraction and elongation.

13. A pitch assembly according to claim 8 wherein a pitch between nests is configured to have a ratio between minimum and maximum pitch of 1:2.

14. A method of adjusting part pitch on a conveyor system, the method comprising:

forming a pitch assembly by supporting a plurality of part nests with a mechanical linkage and at least one linear rail;

mounting the pitch assembly on at least two moving elements of the conveyor system, the plurality of part nests for supporting parts on the at least two moving elements as the at least two moving elements move on the conveyor system;

moving the at least two moving elements apart to increase the pitch between the plurality of nests and parts;

moving the at least two moving elements together to decrease the pitch between the plurality of nests and parts; and maintaining a spacing between the at least two moving elements while moving the at least two moving elements to maintain the pitch between the plurality of nests and parts.

15. A conveyor system according to claim 1, further including an adaptor provided to each of the plurality of nests, between the nest and the rail, wherein each adaptor comprises a curved profile allowing each adaptor to abut an adjacent adaptor.

16. A pitch assembly according to claim 8, further including an adaptor provided to each of the plurality of nests, between the nest and the rail, wherein each adaptor comprises a curved profile allowing each adaptor to abut an adjacent adaptor.

* * * * *